(12) United States Patent
Bueno et al.

(10) Patent No.: US 7,706,502 B2
(45) Date of Patent: Apr. 27, 2010

(54) CARGO CONTAINER INSPECTION SYSTEM AND APPARATUS

(75) Inventors: Clifford Bueno, Clifton Park, NY (US); Joseph Bendahan, San Jose, CA (US); Elizabeth Lokenberg Dixon, Delanson, NY (US); Clarence Lavere Gordon, III, Glenville, NY (US); William Robert Ross, Rotterdam, NY (US); Donald Earl Castleberry, Niskayuna, NY (US); Forrest Frank Hopkins, Cohoes, NY (US); Douglas Albagli, Clifton Park, NY (US)

(73) Assignee: Morpho Detection, Inc., Newark, CA (US)

( * ) Notice: Subject to any disclaimer, the term of this patent is extended or adjusted under 35 U.S.C. 154(b) by 174 days.

(21) Appl. No.: 11/756,144

(22) Filed: May 31, 2007

(65) Prior Publication Data

US 2008/0298545 A1    Dec. 4, 2008

(51) Int. Cl.
  *G01N 23/04* (2006.01)
  *G01N 23/00* (2006.01)
(52) U.S. Cl. .......................................... 378/57; 378/19

(58) Field of Classification Search .................. 378/57, 378/147, 205–207, 102, 196–198
See application file for complete search history.

(56) References Cited

U.S. PATENT DOCUMENTS

| 4,430,568 | A | 2/1984 | Yoshida et al. |
| 4,599,740 | A | 7/1986 | Cable |
| 5,917,880 | A | 6/1999 | Bjorkholm |
| 7,476,023 | B1 * | 1/2009 | Canfield et al. ............. 378/203 |
| 7,486,768 | B2 * | 2/2009 | Allman et al. ................ 378/57 |

OTHER PUBLICATIONS

Seppi, et al. "Megavoltage Cone-Beam Computed Tomography Using A High-Efficiency Image Receptor" Int. J. Radiation Oncology Biol. Phys., vol. 55, No. 3, pp. 793-803, 2003.

* cited by examiner

*Primary Examiner*—Irakli Kiknadze
(74) *Attorney, Agent, or Firm*—Armstrong Teasdale LLP

(57) ABSTRACT

A cargo container inspection radiation detector apparatus is disclosed. The apparatus includes a support, and a plurality of area radiation detectors disposed upon the support arranged corresponding to a height of the cargo container, each area radiation detector comprising an active area defined by a matrix of pixels.

39 Claims, 15 Drawing Sheets

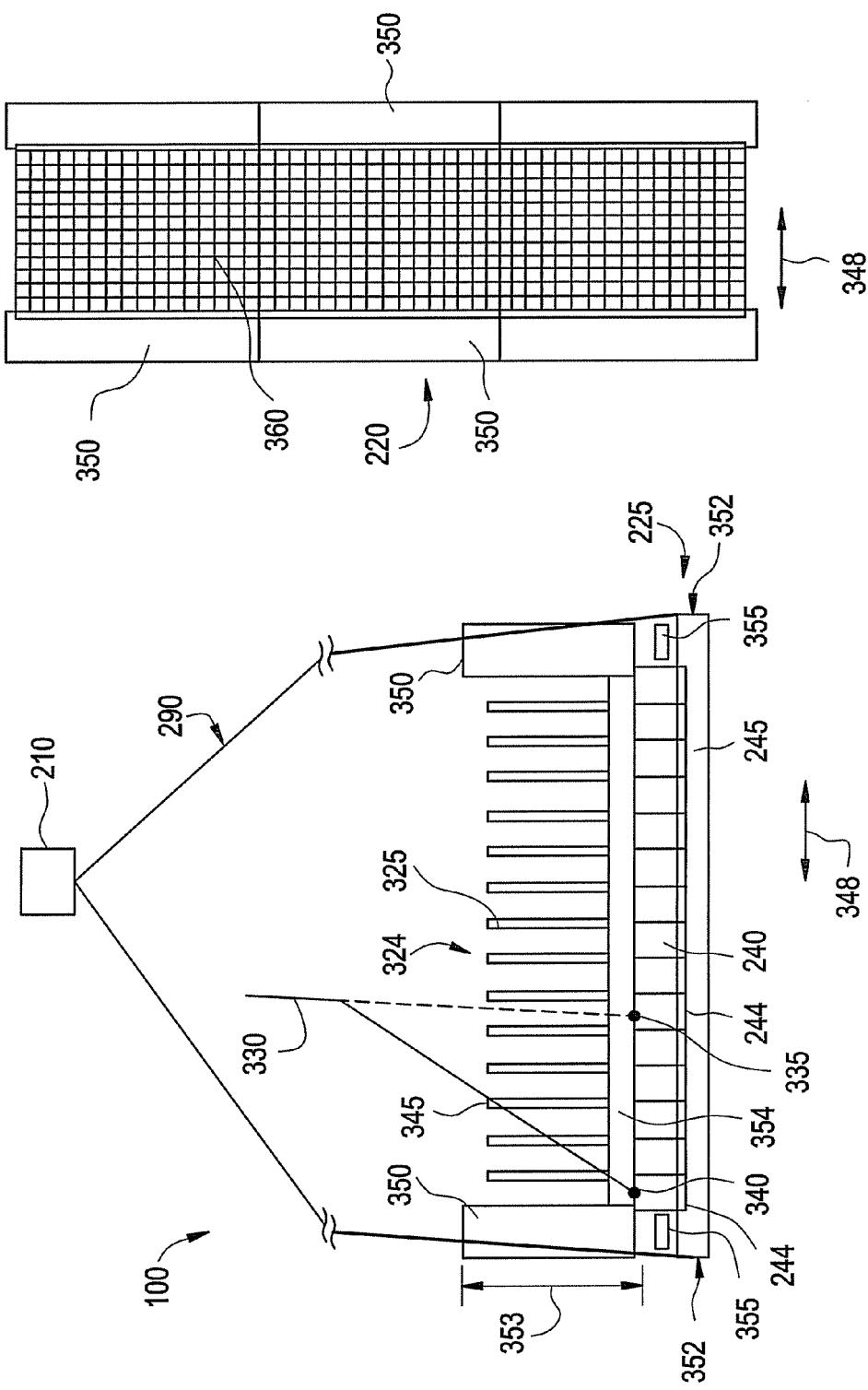

CARGO CONTAINER INSPECTION SYSTEM AND APPARATUS

BACKGROUND OF THE INVENTION

The present disclosure relates generally to detection of items of interest, and particularly to detection of contraband within cargo containers and trucks by employing radiographic means.

The modem global economy relies heavily on intermodal shipping containers for rapid, efficient transport of ocean-going cargo. However, the possibility of concealing weapons of mass destruction (WMDs) and radiological dispersal devices (RDDs) in these containers represents a potential interruption to the free flow of commerce.

Materials of concern such as uranium and plutonium that can be used to make nuclear weapons are characterized by having a high atomic number (high-Z). Similarly, radiological sources can be shielded employing high-Z materials to prevent these from being detected using passive means. Current x-ray inspection systems may employ linear detector arrays (LDA) having a limited width of field of view, resulting in a limited detection signal to noise ratio and inspection throughput. Therefore current x-ray inspection systems may not be capable to detect such materials and other items of interest such as explosives, drugs, and alcoholic beverages, and distinguish these from common materials in the presence of highly attenuating cargo in an expedient fashion. Accordingly, there is a need for a cargo container inspection arrangement that overcomes these drawbacks.

SUMMARY

An embodiment of the invention includes a cargo container inspection radiation detector apparatus comprising a support and a plurality of area radiation detectors disposed upon the support. The plurality of area radiation detectors are arranged corresponding to a height of the cargo container, each area radiation detector comprising an active area defined by a matrix of pixels Another embodiment of the invention includes a cargo container inspection system. The cargo container inspection system includes a processor, a support comprising an inspection cavity dimensioned so as to surround the cargo container, the support in signal communication with the processor, a radiation source in signal communication with and responsive to the processor to transmit a radiation beam directed toward the cargo container; and a plurality of area radiation detectors disposed opposite the radiation source. The plurality of area radiation detectors are disposed upon the support arranged corresponding to a height of the cargo container and in signal communication with the processor to detect an attenuated radiation beam in response to the transmitted radiation beam passing through the cargo container, each area radiation detector comprising an active area defined by a matrix of pixels. The processor analyzes the attenuated radiation beam detected in response to the transmission of the radiation beam directed toward the cargo container to determine a presence or absence of items of interest within the cargo container and generates one of a first signal indicative of the presence of the items of interest, or a second signal indicative of an absence of the items of interest.

These and other advantages and features will be more readily understood from the following detailed description of preferred embodiments of the invention that is provided in connection with the accompanying drawings.

BRIEF DESCRIPTION OF THE DRAWINGS

FIGS. 10 and 12 depict plan views of a cargo container inspection system in accordance with embodiments of the invention;

FIGS. 11 and 13 depict end views of a large area x-ray detector (LAXD) in accordance with embodiments of the invention;

DETAILED DESCRIPTION OF EXEMPLARY EMBODIMENTS

An embodiment of the invention provides a large area x-ray detector (LAXD) for single or multiple-energy radiographic inspection of cargo containers. The LAXD is an array of area detectors that significantly improves a detection capability for items of interest. An increased area of detection provided by the LAXD allows for enhanced radiation data and throughput. In an embodiment, the LAXD can be rotated to obtain volumetric scans of regions of concern within the cargo container. Embodiments of the invention include signal processing methods to enhance the spatial resolution or contrast sensitivity in the images reconstructed from radiation detected by the LAXD.

As used herein, the phrase "cargo container" shall refer to any cargo containment means, such as intermodal cargo containers, crates or boxes within which cargo is disposed, and pallets or skids upon which cargo may be disposed and secured, for example. Further, it is contemplated that such cargo containers may be transported via any appropriate shipment mode, such as by air, sea, or land, and associated with trucks as well as trains, for example. As used herein, the phrase "item(s) of interest" will represent any item shipped via cargo container that may be desired to be identified, such as Special Nuclear Material (SNM), radiological material, explosives, weapons, drugs, cigarettes, and alcohol, for example. In an embodiment, the LAXD is used to detect items of interest having a high atomic number, also herein referred to as high Z-material, or other high-density material included to attempt to shield from detection SNM and radiological materials within the cargo container. As used herein, the term "high atomic number" shall refer to materials with an atomic number greater than about 57. In another embodiment, the LAXD is used to detect items of interest based upon an unexpected density variation or gradient, such as to detect drugs, explosives or other contraband within a cargo container.

Figure 1:
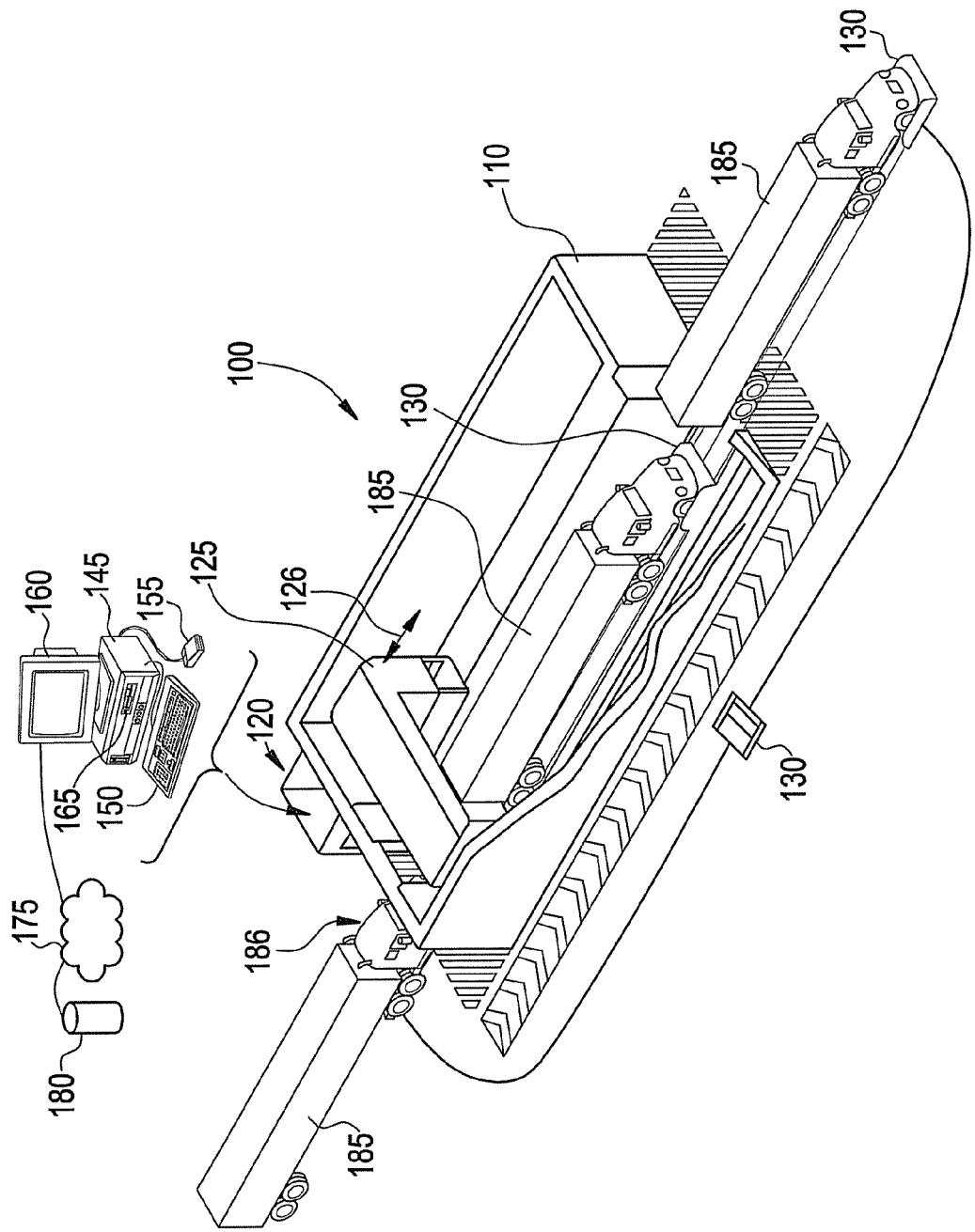
FIG. 1 depicts a cargo container inspection system in accordance with an embodiment of the invention.

Referring now to FIG. 1, a perspective cut-away view of an inspection system 100 is depicted. The inspection system 100 includes an enclosure 110, such as a building, to control, via shielding for example, a radiation level outside the building 110 resulting from the inspection process therein. In an embodiment, the building 110 includes an office 120, a support 125, such as a mobile gantry, also herein referred to as a gantry, and a set of truck-towing platforms 130. Within the office 120 is a processor 145, such as a computer, in signal communication with the gantry 125 and the set of towing platforms 130. The processor 145 includes input devices 150, 155, such as a keyboard and mouse, an output device 160, such as a display screen, and a program storage device 165, such as a hard disk drive, for example. The program storage device 165 includes a program executing on the processor 145 for performing a method of inspection of a cargo container 185 and improvement of a signal to noise ratio of cargo container 185 inspection images, which will be discussed in more detail below. The processor 145 may be in signal connection with a network 175, such as the Internet or an intranet, for example, that is in further connection with a database 180 that stores information associated with the inspection of cargo containers 185, also herein referred to as containers. Such information may include inspection results, shipment manifest, point of origin, and other information that may be associated with the containers 185.

In an embodiment, the truck-towing platforms 130 are responsive to the processor 145 to convey trucks 186 at least one of into, through, and out of the building 110. The utilization of at least one of the truck-towing platforms 130 and the mobile gantry 125 allow for a pipeline of the containers 185 for performing various processes in parallel with other processes, thereby preventing "waiting" periods that reduce the throughput. The use of the towing platforms 130 allows for increased throughput by eliminating a delay associated with an exit by a driver from the building 110. The mobile gantry 125 is responsive to control signals provided by the processor 145 to scan the container 185 at variable speed, forward and backward. The mobile gantry 125 further allows a more detailed, or "target" scan to be performed in response to possible discovery of items of interest, as will be described further below.

While an embodiment has been described having truck-towing platforms 130 to convey the trucks 186 into, through, and out of the building 110, it will be appreciated that the scope of the embodiment is not so limited, and that the embodiment will also apply to inspection systems 100 that include other container 185 movement arrangements, such as container support platforms to convey the container 185 at least one of into, through, and out of the building 110, to have the driver drive the truck 186 at least one of into, through, and out of the building 110, and to incorporate the building 110 surrounding a railroad track, for example.

Figure 2:
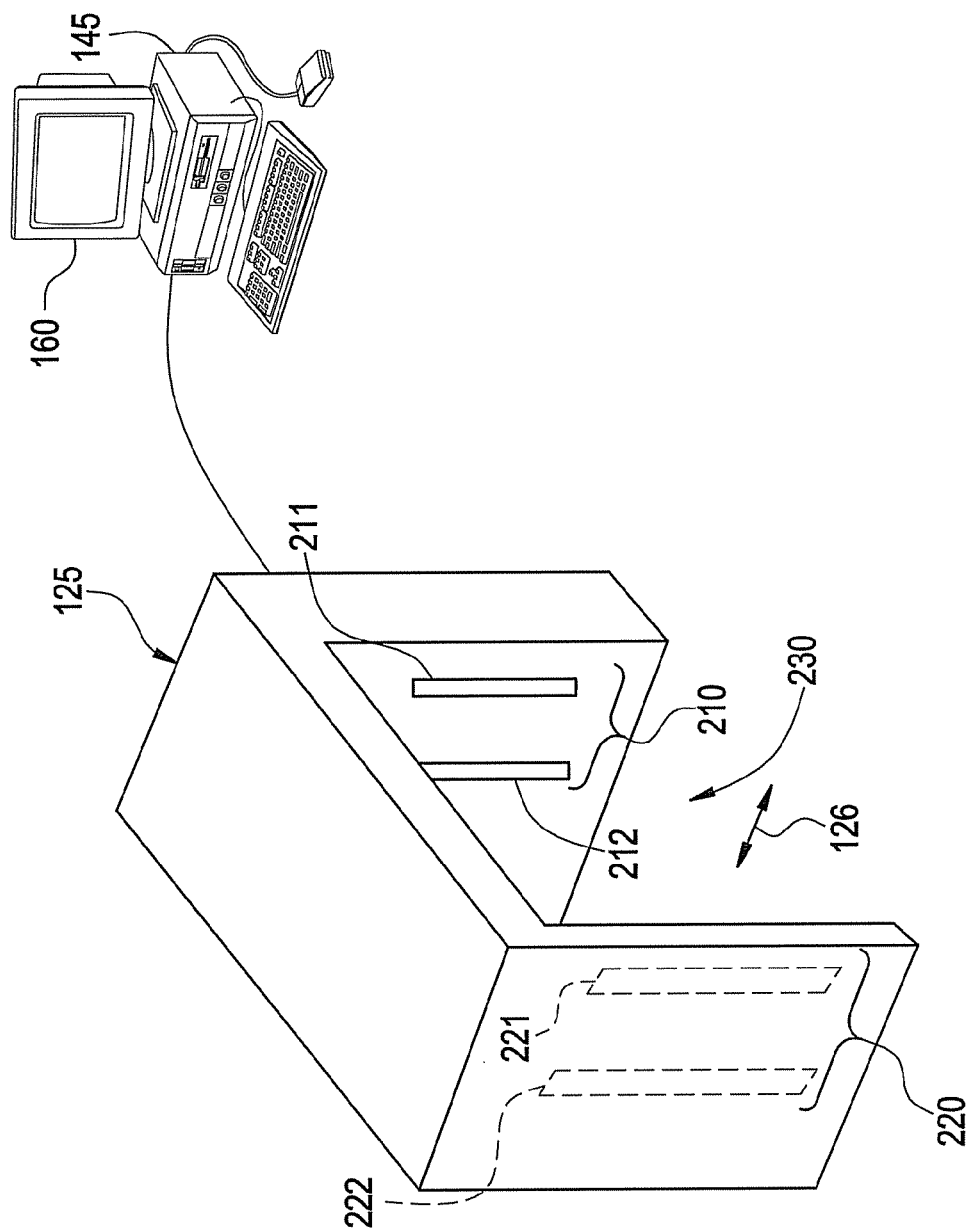
FIG. 2 depicts a perspective view of a gantry in accordance with an embodiment of the invention.

Referring now to FIG. 2 in conjunction with FIG. 1, a top perspective view of the gantry 125 is depicted. The gantry 125 includes at least one radiation detector array 220, such as a LAXD. In one embodiment, the gantry 125 also includes at least one radiation source 210, such as an x-ray source. In an embodiment, the radiation source 210 includes a linear particle accelerator to generate a beam of x-rays. The radiation source 210 and radiation detector array 220 are opposingly disposed so as to be separated by an inspection cavity 230, dimensioned to surround and allow movement of the container 185 therethrough. The radiation source 210 is in signal communication with and responsive to the processor 145 to transmit a radiation beam directed toward the radiation detector 220 to pass through the container 185. The radiation beam passing through the container 185 is attenuated in response to material characteristics of contents within the container 185. After passing through and becoming attenuated by the container 185, the detector 220 receives the attenuated radiation beam. The detector 220 receives, or detects, the attenuated radiation beam and produces a set of electrical signals responsive to the intensity of the attenuated radiation beam. It will be appreciated that in response to motion of at least one of the container 185 and the gantry 125, the set of electrical signals vary along a length, as defined by a travel axis 126, of the container 185. The set of electrical signals is made available to the processor 145, which executes a reconstruction program to interpret and represent the set of electrical signals as an image data set to be further analyzed, and displayed upon the display screen 160.

While an embodiment has been described having a linear accelerator to accelerate electrons to generate x-rays, it will be appreciated that the scope of the invention is not so limited, and that the invention will also apply to other detection systems 100 that use other forms of radiation, such as protons impinging on one or more target materials to generate gamma ray radiation, and deuterons impinging on deuterium, for example, to generate neutron radiation, for example. Further a radioisotope source, which emits gamma rays, may be used as the radiation source 210. Further, while an embodiment has been depicted having the radiation source 210 and the radiation detector 220 disposed upon one support 125, it will be appreciated that the scope of the invention is not so limited, and that embodiments of the invention will also apply to other systems 100 having the radiation source 210 and the radiation detector 220 mounted upon separate supports, for example.

In an embodiment, the processor 145 is receptive of and responsive to a screening that provides the set of electrical signals (also herein referred to as a screening detector signal) in response to transmission of a screening radiation beam, such as a screening x-ray beam. The transmission of the screening x-ray beam is along a length, or screening portion of the container 185. The processor 145, upon obtaining information from the screening, creates an image data set for displaying upon the display screen 160 images of the screening portion of the container 185. The processor 145 further analyzes the image data set to determine a likelihood of a presence of an item of interest, such as an item having at least one of high-Z material, and shielding material that may affect the ability of the screening x-ray beam from the source 210 to adequately penetrate the container 185 and be detected by the detector 220, for example. For example, the processor 145 may analyze the image data set to identify an unusual or unexpected density gradient, or the processor 145 may analyze the screening detector signal to determine if the screening detector signal is in excess of a threshold value. In response to the processor 145 determining a likelihood of a presence of items of interest within the container 185, the processor 145 identifies one or more target portions of the container 185 that are likely to contain the items of interest.

In response to determining a likelihood of a presence of items of interest within the container, the processor 145 causes a transmission of a target radiation beam, such as a target x-ray beam to provide a further inspection of contents within the container 185. The transmission of the target x-ray beam is along a length, or target portion of the container 185. In an embodiment, the screening portion represents an entire length of the container 185, and the one or more target portions represent lengths of portions of the container 185 that the processor 145 has determined have a likelihood of the presence of the items of interest. In an embodiment, the mobile gantry 125 is responsive to the processor 145 to translate along at least one of the screening portion and the identified target portion of the cargo container 185.

Subsequent to transmission of the target x-ray beam, the processor 145 is receptive of and responsive to a set of target electrical signals provided by the detector 220 corresponding to the detected attenuated target x-ray beam. An image data set is created for displaying upon the display screen 160 images of the target portion of the container 185. The processor 145 further analyzes the image data set created from the target electrical signals to determine a presence or absence of the items of interest within the cargo container 185. The processor 145 is further configured to generate one of a first signal indicative of the presence of the item of interest or a second signal indicative of the absence of the item of interest.

In an embodiment, the gantry 125 includes a low energy radiation source 211, such as a low energy x-ray source, and a high-energy radiation source 212, such as a high-energy x-ray source also herein respectively referred to as a first and a second radiation source 211, 212. The first and second radiation sources 211, 212 provide a set of multiple energy radiation beams, such as a set of multiple-energy x-ray beams. In an embodiment, the set of multiple-energy radiation beams is a dual-energy x-ray beam. The gantry 125 also includes two detector arrays 221, 222. The first x-ray source 211 generates one energy distribution of the multiple-energy x-ray beam and the second x-ray source 212 generates another energy distribution of the multiple-energy x-ray beam. The processor 145 is receptive of and responsive to the different electrical signals provided by the detector arrays 221, 222 in response to the detection of the multiple-energy x-ray beam from the x-ray sources 211, 212. The processor 145 provides an image of the container 185 contents via a technique known in the art as energy discrimination or dual-energy imaging. It will be appreciated that in response to a variation in material responses to different energy distributions, the energy discrimination imaging provided by the processor 145 distinguishes between different materials that may possess similar densities. This is in contrast to the capability to distinguish between the attenuation (resulting from differing densities) of different materials in single-energy x-ray imaging. At least one of the screening x-ray beam and the target x-ray beam include the multiple-energy radiation beam. As disclosed herein, the gantry 125 includes the first and second x-ray sources 211, 212 and provides the ability to identify the target portions of the container 185 as necessary to provide adequate detection accuracy.

In another embodiment, the gantry 125 includes one radiation source 211 known in the art as an interlaced radiation source 211, such as an interlaced x-ray source 211, and the radiation detector array 221. The interlaced x-ray source 211 is capable of alternating between emitting different x-rays at more than one energy distribution in a very rapid fashion. The screening x-ray beam includes one scan of the screening portion of the container 185, emitting in rapid alternating fashion more than one energy distribution from the interlaced x-ray source 211, thereby providing the multiple-energy x-ray beam. It will be appreciated that the emission, in rapid alternating fashion, of the more than one energy distribution makes available to the processor 145 the necessary signals to develop a multiple-energy image of the contents of the container 185. In an embodiment, the target x-ray beam also includes the set of multiple energy x-ray beams provided by the interlaced x-ray source 211. Alternatively one or more non-interlaced sources 210, 211 may be utilized to provide the set of multiple-energy x-ray beams in conjunction with one detector array 221, in a "step and shoot" fashion. In the "step and shoot" fashion, each energy level of the multiple energy x-ray beams is detected by the one detector array 221 following another at a given position before displacement of the gantry 125 to a next position for subsequent multiple-energy detection.

In an embodiment, the image data set is analyzed in real time to minimize the time to produce an alarm decision by the processor 145, such as in response to the processor 145 determining that the image data set created from the target signals indicates a likelihood of a presence of items of interest. Alternatively, the image data set of the container 185 is displayed upon the display screen 160 with a minimal delay resulting from the necessary time to process the image data set into a visual image, thereby allowing an operator to start inspecting the images before the scan is completed. The images are analyzed in real time to minimize the time to produce a "clear" decision that at least one of the truck 186 and the container 185 are absent of any item of interest, and to allow the truck 186 and container 185 to leave.

In an embodiment, identified target portions of the container 185 that the processor 145 has determined may include the items of interest are presented to the operator via the display 160 of the processor 145. The operator can employ an image viewer to analyze a resulting image with a variety of image viewing and manipulation tools included with the reconstruction program executing on the processor 145. Operating procedures will instruct the operator to either clear the alarm based upon analysis of the images and release the truck 186, or to follow further alarming resolution procedures, such as devanning to remove the cargo from the container 185 for further inspection.

Figure 3:
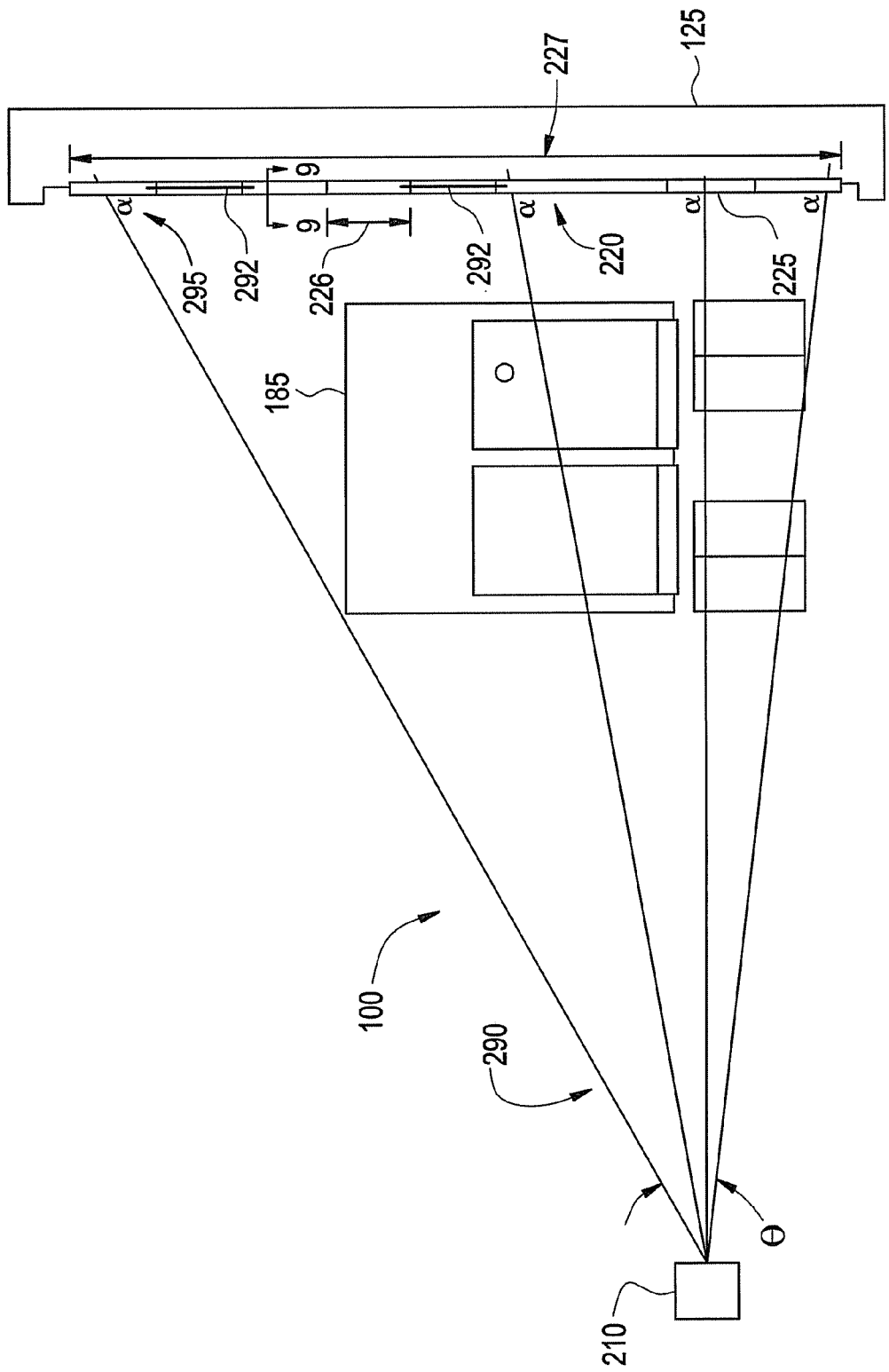
FIG. 3 depicts an end view of an inspection system in accordance with an embodiment of the invention.

Referring now to FIG. 3, an embodiment of the inspection system 100 including the LAXD 220 is depicted. The LAXD 220 is disposed upon the gantry 125 and includes a plurality of area radiation detectors 225, such as flat panel radiation detectors, for example. The number of area radiation detectors 225 (also herein referred to as "area detectors") disposed upon the gantry 125 is a function of a height 226 of each area detector 225 and a detection envelope height 227 of the LAXD 220. That is, the LAXD 220 includes a number of area detectors 225 corresponding to a height of the container 185, to provide the detection envelope height 227 of the LAXD 220 as appropriate for inspection of the container 185. The height 226 of each area detector 225 need not be equal. In an embodiment, each area detector 225 of the plurality of area detectors 225 are disposed in line upon the gantry 125. Use of the LAXD 220 including the plurality of area detectors 225 provides the appropriate detection envelope height 227 for inspection of the container 185 and allows the entire container 185 to be imaged with a single translational pass of the container 185 through the gantry 125. It will be appreciated that the LAXD detectors may also be disposed to inspect a portion of the container 185 height. In an exemplary embodiment, each area detector 225 includes an amorphous silicon detector array. In another embodiment, each area detector 225 includes a CMOS area detector array. In another embodiment, each area detector 225 includes CCDs, lens coupled to phosphors or scintillators that have been optimized for x-ray detection at a chosen energy, as will be described further below. Appropriate phosphors or scintillators can be used with any silicon read device listed above. It will be appreciated that the foregoing area detector technologies are for illustration and not limitation, and that use of other area detector technologies, such as amorphous selenium detectors are contemplated as within the scope of an embodiment of the invention.

Use of the plurality of area detectors 225 of the LAXD 220 provides an enhancement or improvement in a rate of x-ray data capture and signal statistics over a typical linear detector array (LDA). The enhanced radiation data rate is related to a ratio of widths of the LAXD 220 to the LDA. For example, a typical LDA utilizes a 4 millimeter (mm) square pixel. An exemplary LAXD 220 is contemplated to utilize area detectors 225 that have an active area (to be described further below) with a width (into the plane of the page of FIG. 3) of 200 mm. This provides a width ratio of 50, which represents a maximum signal to noise ratio (SNR) improvement of about 7.

Figure 4:
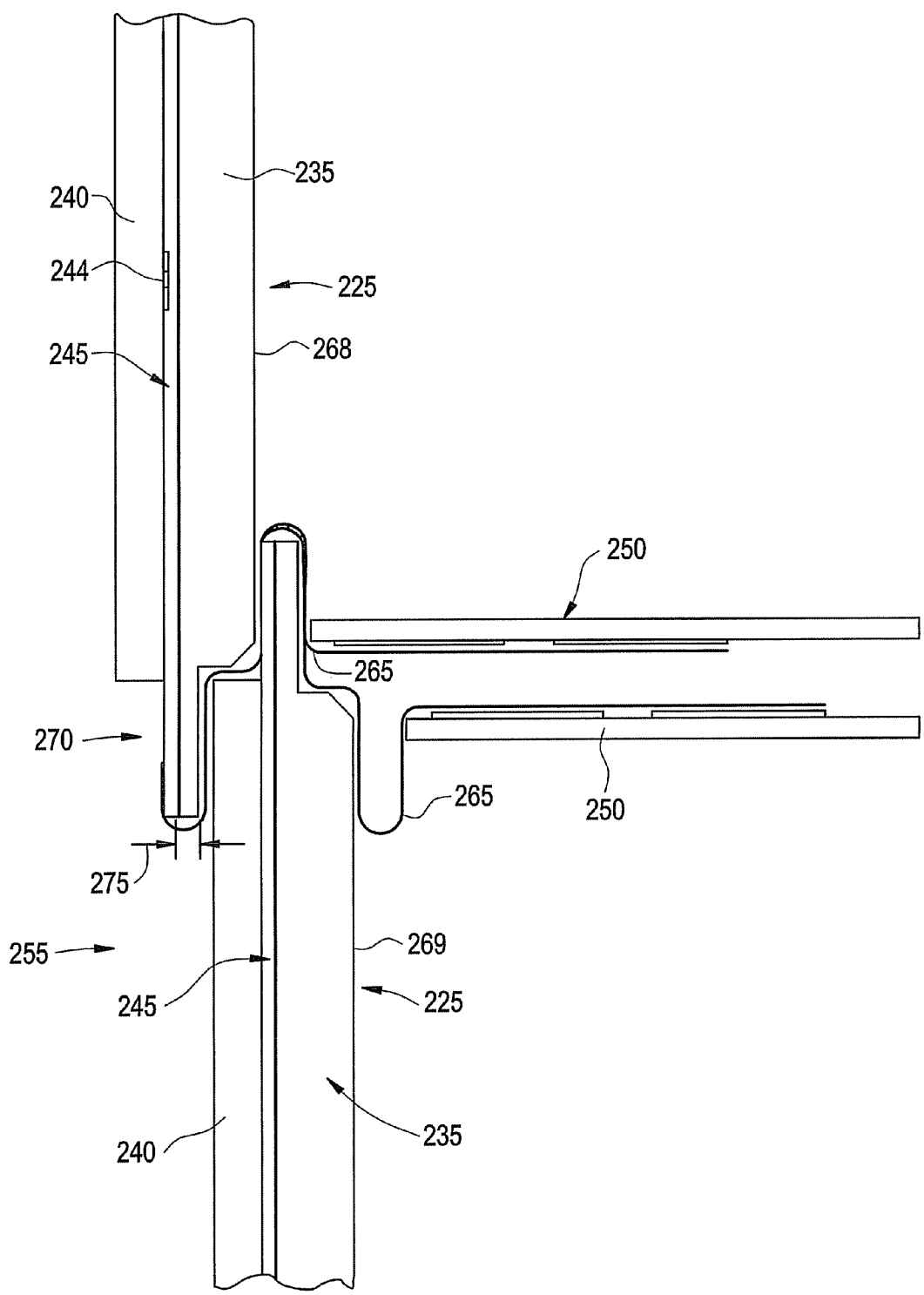
FIG. 4 depicts an enlarged end view of two area radiation detectors in accordance with an embodiment of the invention.

Referring now to FIG. 4 an enlarged end view of two adjacent area detectors 225 is depicted. Each area detector 225 includes a support base 235, a scintillator 240, a substrate 245, and at least one circuit board 250. In response to an incoming x-ray beam 255, the scintillator 240 is excited and emits light, or photons. The scintillator 240 emits an amount of light that is directly related to the strength of the incoming x-ray beam 255.

Disposed upon the substrate 245, such as a glass substrate for example, is an array of sensors 244, such as photodiodes for example, which may each represent one or more pixels for example. The sensors 244 are receptive of the photons and generate the electronic signals. Each sensor 244, at a particular position within the array of sensors 244, detects an intensity of light emitted by the scintillator 240. The intensity of light corresponds to the energy deposited by the x-ray beam, resulting from the beam attenuated by the densities and path lengths of the materials disposed between the x-ray source 210 and the scintillator 240 of the area detector 225. The processor 145 is receptive of the electronic signals corresponding to the intensity of light of each position of each sensor 244 to reconstruct the image data set representative of geometry of a particular density of the item of interest disposed between the x-ray source 210 and the area detector 225. It will be appreciated that each area detector 225 includes an active area defined by the height 226 (best seen with reference to FIG. 3) and a width (into the plane of the page of FIG. 4) of the scintillator 240 and array of sensors 244 disposed upon the substrate 245. Typical area detectors 225 have an active area with a height and a width of 5 centimeters or greater, and are contemplated to include sensors to define a matrix of pixels including at least 256 rows and columns, for example. Exemplary embodiments of area detectors 225 are contemplated to have an active area with a height and width of approximately 20 centimeters, including sensors to define a matrix of pixels with at least 1024 rows and columns. Other examples could include area detectors 225 with width and height dimensions down to 5-cm and up to 50-cm. Given that the matrix of pixels may be at a count of 256 rows and columns or greater, it is contemplated that the LAXD 220 provides significantly higher spatial resolution.

Appropriate phosphors or scintillators can be used with any silicon read device listed above and include structured Cesium Iodide activated by thallium (CsI:T1)), Cadmium tungstate (CsWO4), continuous sheets of scintillation material, pixelized assembly of discrete scintillation elements, and scintillating fiber optic faceplates of luminescent glass, for example. In one embodiment, the scintillators are non-segmented, such as Gadolinium oxysulfide (GOS) screens or thin needles obtained by depositing (CsI:T1) onto substrate 245 for example. These types of scintillators result in a detector resolution similar to that of the photodiodes 244. In another embodiment, the scintillator 240 is segmented, or pixelized to a size suitable for the required spatial resolution. A suitable resolution contemplated for cargo inspection applications is several millimeters. The segmentation does not have to be isotropic. An exemplary embodiment includes thick scintillators to increase the detection efficiency.

In an embodiment, the array of photodiodes 244 are amorphous silicon photodiodes 244 disposed upon the substrate 245 in signal communication with the circuit board 250 via a flexible conductor 265. The flexible conductors 265 allow disposal of the circuit boards 260 such that they do not affect the active area of the area detectors 225. In an embodiment, a portion of at least one of the support base 235 and the substrate 245 of one of the area detector 268 overlaps a portion of the active area of an adjacent area detector 269 to minimize any missing information that results from a gap between active areas of adjacent area detectors 268, 269. In an overlap area 270, a thickness 275 of the support base 235 is reduced, thereby reducing an attenuation of the x-ray beam 255 that must travel through the support base 235 in the overlap area 270. In an exemplary embodiment, the active areas of the two area detectors 268, 269 are adjacent and provide a continuous combined active area, absent any gaps. Inspection of the container 185 is contemplated to utilize high energy, such as 6 to 9 Mega electronVolts (MeV), such that detector 269 will not be attenuated significantly in the overlap area 270.

Figure 5:
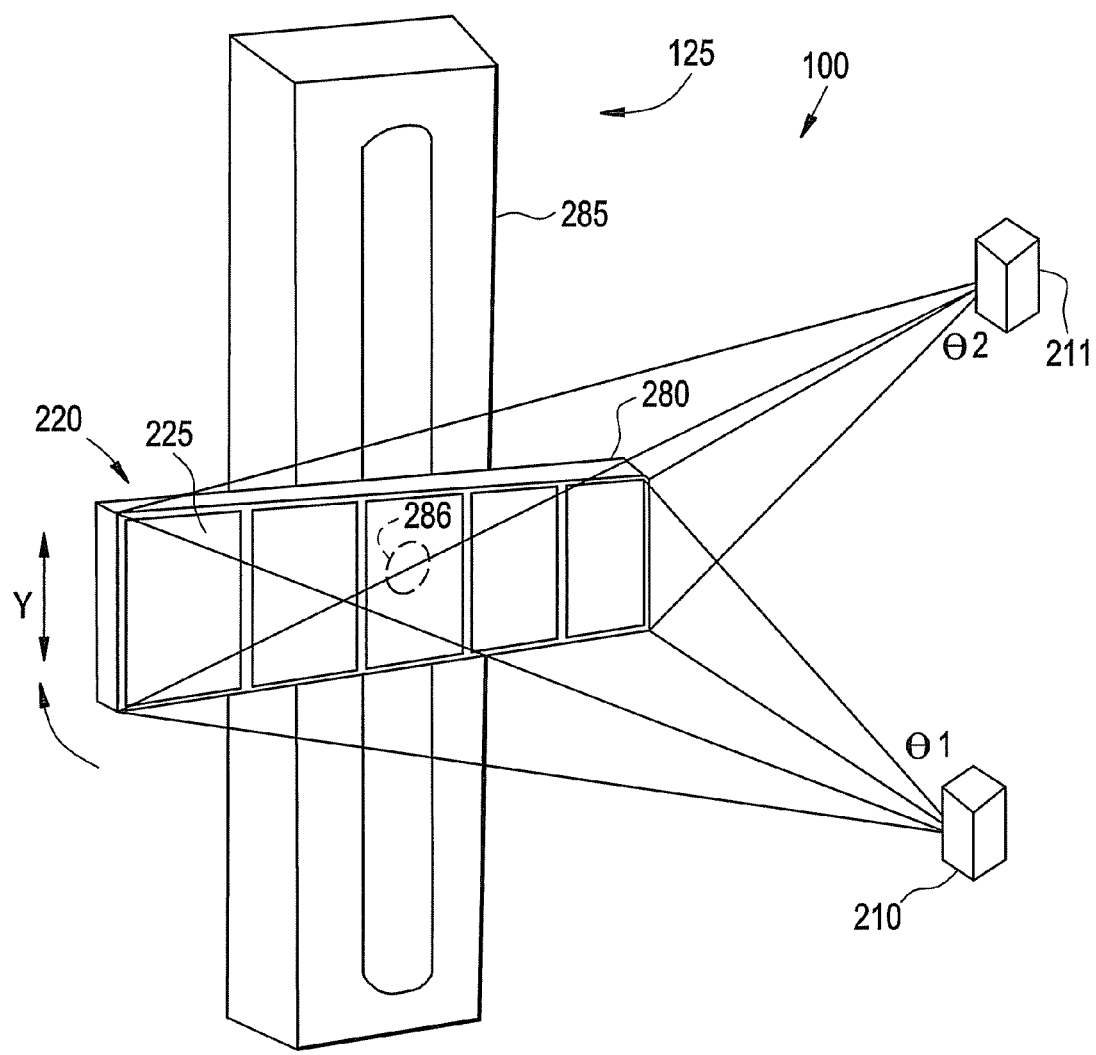
FIG. 5 depicts a perspective schematic view of an inspection system in accordance with an embodiment of the invention.

Referring now to FIG. 5, an embodiment of the inspection system 100 with the gantry 125 including a rotating LAXD 220 is depicted. Area detectors 225 of the LAXD 220 are attached to a support 280, which is attached to a pivot 286 on the frame 285 of the gantry 125. The support 280 rotates relative to the frame 285 to change an orientation, also herein referred to as a first orientation, of the plurality of area detectors 225 of the LAXD) 220 relative to the frame 285. In an embodiment, the support 280 also includes a translational degree of freedom, as indicated by direction line Y. While an embodiment has been depicted having one support 280 upon which the plurality of area detectors 225 are disposed, it will be appreciated that the scope of the invention is not so limited, and that the invention will also apply to gantries 125 that may include more than one support, with the supports configured to change the orientation of the plurality of area detectors 225 of the LAXD 220.

In response to a determination and identification by the processor 145 of at least one target portion of the container 185 that includes a likelihood of a presence of an item of interest, the gantry 125 is responsive to a rotation signal provided by the processor 145 to rotate the support 280 to an alternate orientation relative to the frame 285, as depicted in FIG. 5. The gantry 125 is also responsive to a translation signal provided by the processor 145 to dispose the rotated support 280 at a location corresponding to a location of the likely items of interest within the container 185. This results in a transformation of the LAXD 220 from a vertical orientation to a horizontal orientation, which provides, in the horizontal direction, increased volumetric information about the container 185 and contents therein. In addition, at least one of the LAXD 220 array and x-ray source 210 may be moved vertically to intersect the region of interest. In an embodiment, subsequent to rotation of the support 280, at least one of the gantry 125 and the x-ray source 210, and the container 185 are translated horizontally relative to each other while projecting the x-ray beam from the source 210 to the LAXD 220, thereby performing what is known as a laminography or limited angle computed tomography inspection. The laminography or limited angle computed tomography inspection enables multi-angle imaging that provides three-dimensional information to help in estimating the location and shape of items of interest within the container 185. It is understood that a complete reconstruction is not necessary, in that simply acquiring a greater number of angles about the item of interest might provide enough information to resolve its thickness and its relative position in the container.

In a further embodiment, at least one of the source 210 and the rotated area detectors 225 are moved vertically to other positions to provide more views, which allows for improved three-dimensional information. In another embodiment, more than one source 210, 211 are disposed at different heights relative to the plurality of area detectors 225, thereby providing additional radiation transmission angles for laminography. For example, the first radiation source 210 is disposed so as to provide a first angle θ1 from the first source 210 relative to the plurality of area radiation detectors 225, and the second source 211 is disposed so as to provide a second angle θ2 from the second source 211 relative to the plurality of area radiation detectors 225.

In an embodiment, the gantry 125 includes a motor responsive to the processor 145 to rotate the support 280 relative to the frame 285. It is contemplated that other means of rotation, including manual rotation following an appropriate indication by the processor 145 may be used to change the orientation of the support 280 relative to the frame 285.

Referring back now to FIG. 3, the active area of each area detector 225 defines a plane such as planes 292 (two of which are depicted in FIG. 3) indicated by a line that extends into the plane of the page of FIG. 3. The plurality of planes, such as the planes 292, defined by the active areas of the plurality of area detectors 225 depicted in FIG. 3 are parallel to each other.

It will be appreciated that in order to project a plurality of x-ray beams 290 from the x-ray source 210 such as to arrive at the entire detection envelope height 227 of the LAXD 220, the plurality of x-ray beams 290 include an angle θ. It will be further appreciated that at different locations along the detection envelope height 227 of the LAXD 220, each x-ray beam of the plurality of x-ray beams 290 form different angles a incident to each area detector 225 of the LAXD 220. In an ideal situation, the incident angle α is equal to 90 degrees with respect to the plane of area detector 225. As the incident angle of a particular x-ray beam deviates from 90 degrees, such as is depicted proximate reference numeral 295, an area of the scintillator 240 responsive to the particular x-ray beam to emit light is increased, and a greater number of sensors generate the signal responsive to light emitted by the scintillator 240 corresponding to the particular x-ray beam. This phenomenon is known as crosstalk and is generally undesirable, as it associates more sensors (that is, image pixels) of the array of sensors with the particular x-ray beam, which leads to inaccuracies in reconstruction of the image data set.

Figure 6:
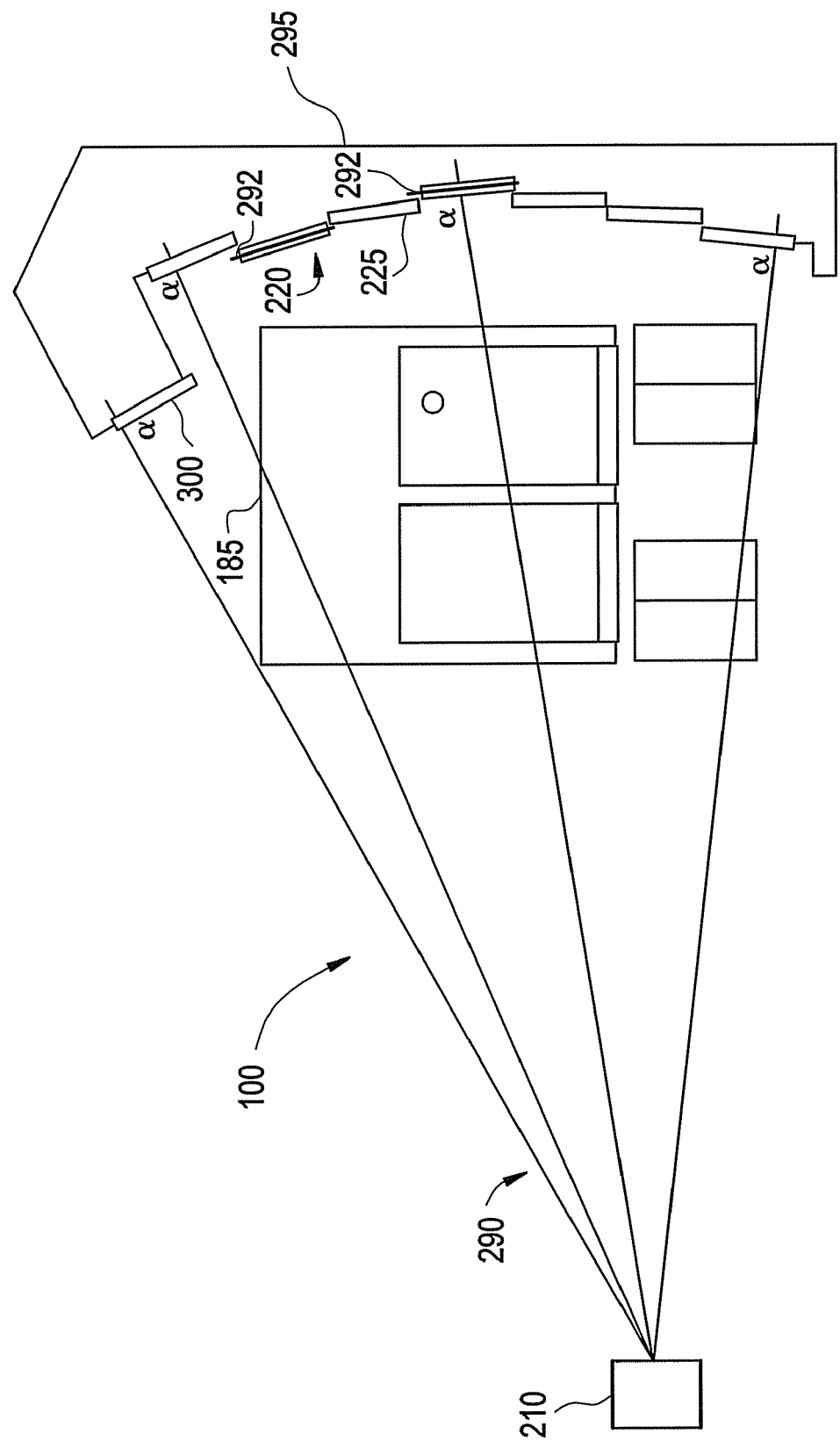
FIGS. 6-9 depict end views of an inspection system in accordance with embodiments of the invention.

Referring now to FIG. 6, an alternate embodiment of a gantry 295 including area detectors 225 staggered and directed toward a common point, such as an origin of radiation corresponding to the x-ray source 210, in an L-shaped configuration is depicted. The staggered L-shaped configuration provides the planes 292 defined by the active areas of the area detectors 225 oriented perpendicular to the x-ray source 210 to significantly reduce deviation of the incident angles α of each x-ray beam of the plurality of x-ray beams 290 from 90 degrees as compared to the embodiment of the gantry 125 depicted in FIG. 3. The embodiment of the gantry 295 does not permit rotation of all the area detectors 225 of the LAXD 220, however, as the container 185 is in the rotation path of a top area detector 300.

Figure 7:
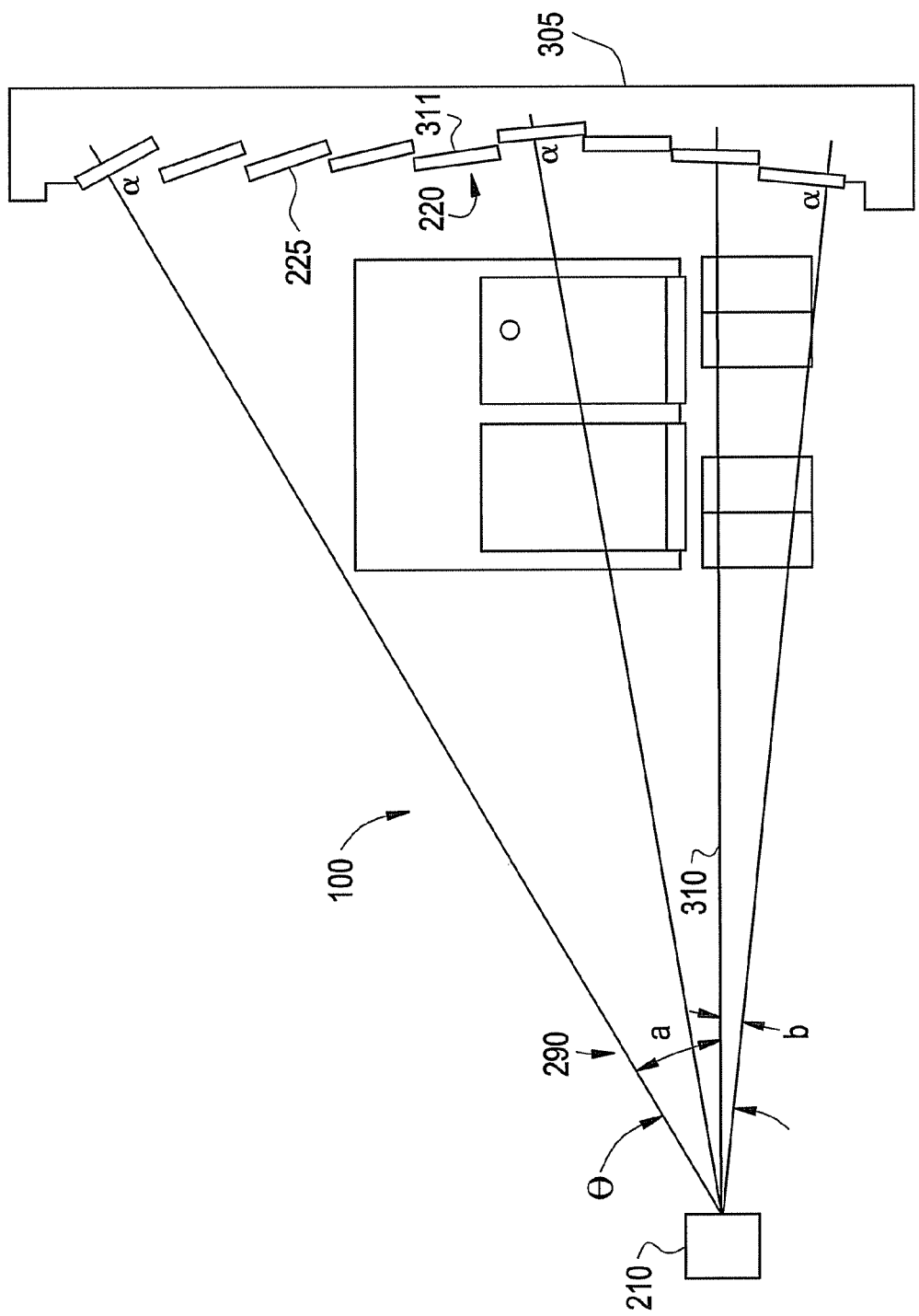

FIG. 7 depicts an alternate embodiment of a gantry 305 including area detectors 225 staggered and oriented perpendicular to the x-ray source 210 to significantly reduce deviation of the incident angles α of each x-ray beam of the plurality of x-ray beams 290 from 90 degrees. The included angle θ of the plurality of x-ray beams 290 about a line 310 projected orthogonally from the x-ray source 210 is not symmetric. That is, a portion "a" and a portion "b" of the included angle θ are not equal. With the exception of centerline 310, rotation of the LAXD 220 about any of the lines joining the x-ray source 210 and an individual area detector 225, for example a middlemost detector 311, will result in all other area detectors 225 no longer being directed toward the x-ray source 210 and increased cross talk in all of those detectors. Additional limitations in clearances of the detectors 225 of the inspection envelope could also result.

Figure 8:
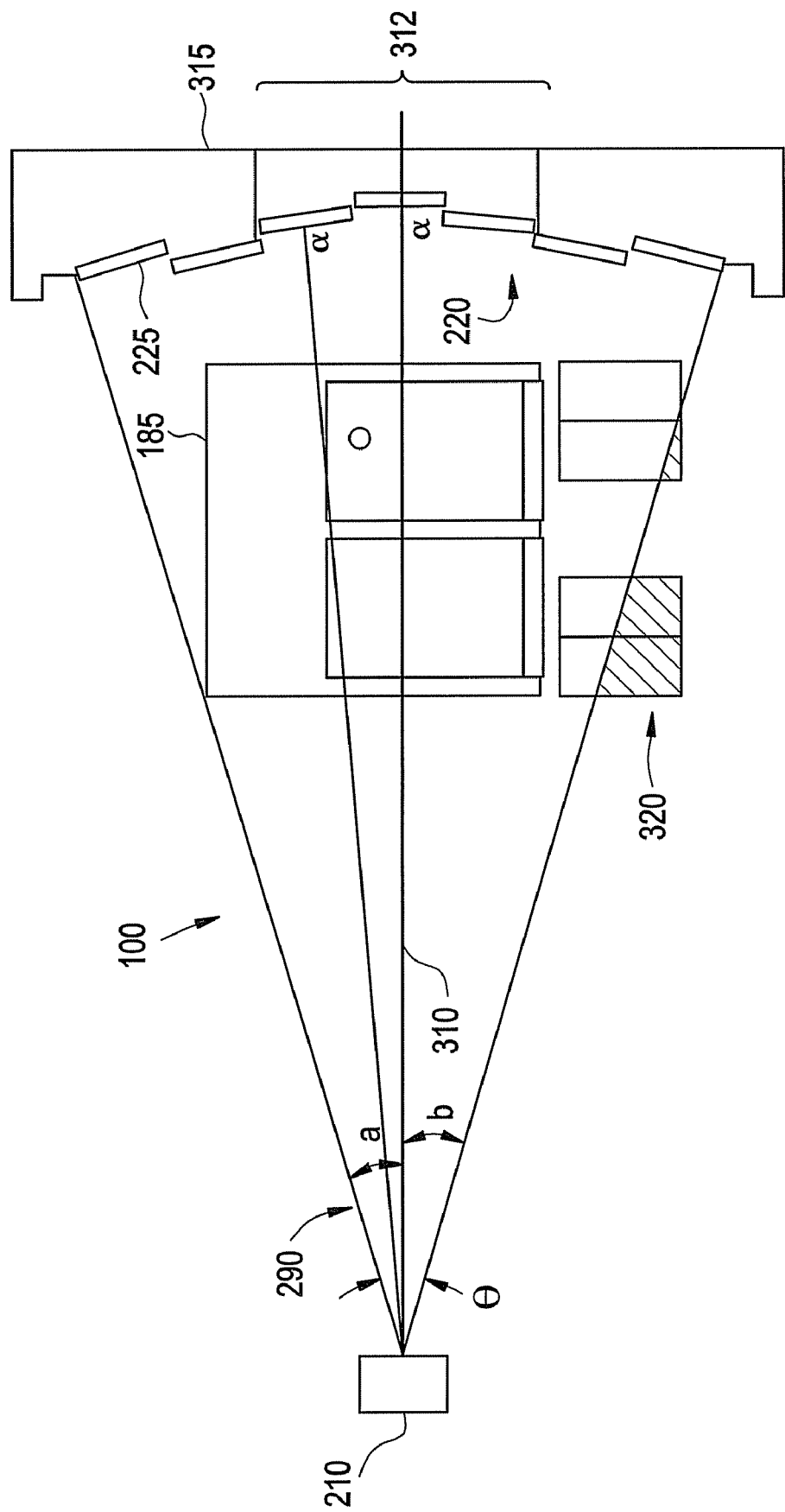

FIG. 8 depicts another embodiment of a gantry 315 including area detectors 225 staggered and oriented perpendicular to the x-ray source 210 to significantly reduce deviation of the incident angles a of each x-ray beam of the plurality of x-ray beams 290 from 90 degrees. The x-ray source 210 is disposed such that the included angle θ of the plurality of x-ray beams 290 about the line 310 projected orthogonally from the x-ray source 210 is symmetric. That is, the portion "a" and the portion "b" of the included angle θ are equal. Accordingly, rotation of the LAXD 220 about the system centerline 310 will maintain the perpendicularity of the x-ray beam to the surfaces of the area detectors 225 and preserve the level of cross talk evident within individual area detectors 225 in the vertical orientation of the array of detectors 225 within the LAXD 220. However, such geometry of the plurality of x-ray beams 290 is not optimal for container 185 inspection, as it requires at least one of a need to dispose area detectors 225 under a floor and an inability to inspect a portion 320 (indicated via hatch lines) of the container 185 or the truck 186 disposed proximate the x-ray source 210. This type of inspection is contemplated to be more suitable for vertically symmetric objects such as stand-alone cargo containers.

A further embodiment includes the LAXD 220 in which a portion 312 of the plurality of area detectors 225 are rotated, while the remaining area detectors 225 remain in their original position. In an exemplary embodiment, the portion 312 of area detectors 225 are disposed at the center of the LAXD, and can be rotated at an angle of 90 degrees, as described above.

Figure 9:
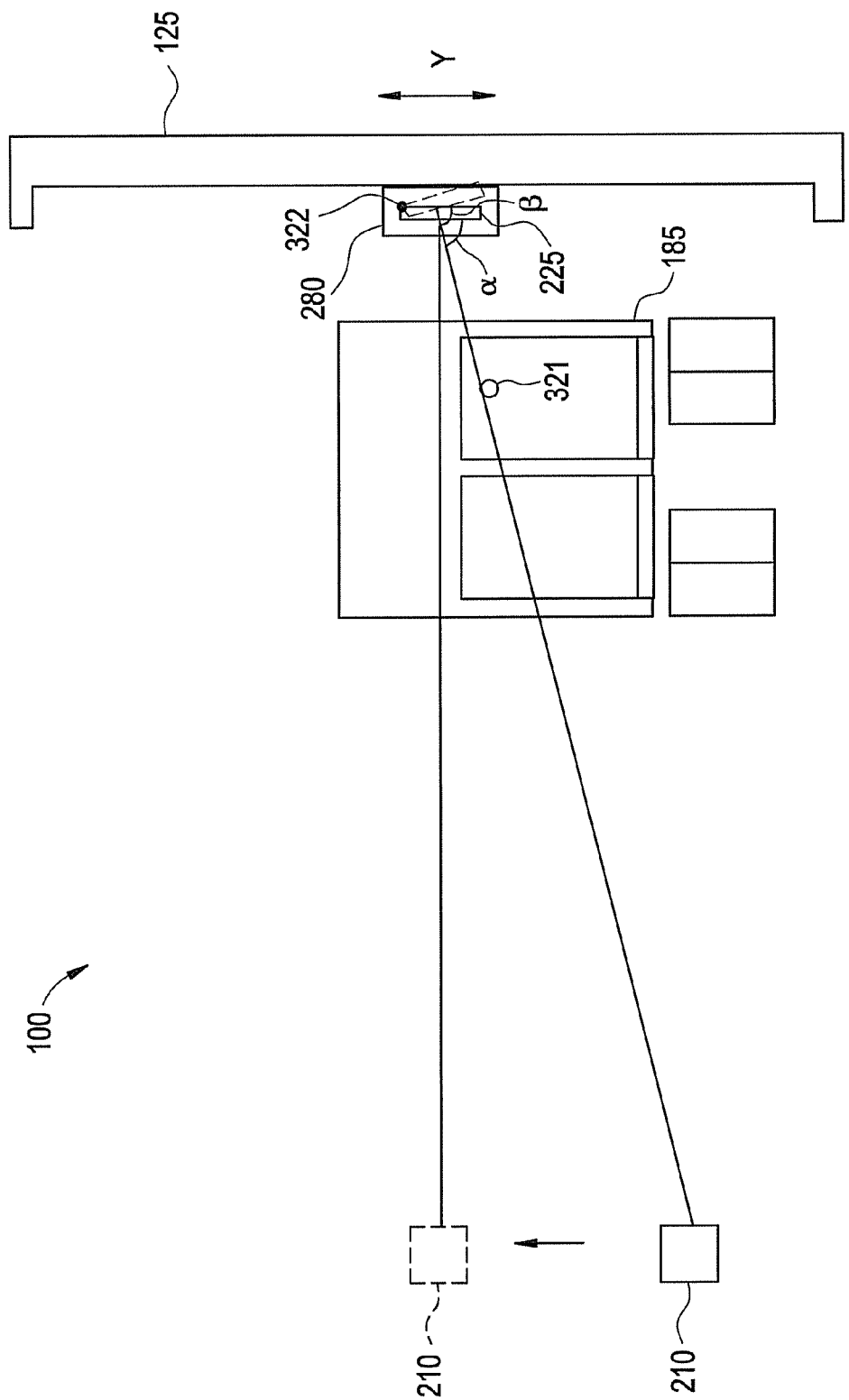

Referring now to FIG. 9, in conjunction with FIG. 5, an embodiment of the inspection system subsequent to rotation of the support 280 is depicted, such that the plurality of area detectors 225 are disposed into the plane of the page. The support 280 has been disposed along the translational degree of freedom (indicated by direction line Y) for inspection of an item of interest 321 within the container 185. The incident angle α can be seen to deviate from the ideal 90 degrees.

In an embodiment, each area detector 225 is responsive to the processor 145 to be orientated toward a focal point, such as the source 210 to thereby provide an incident angle β having a reduced deviation from 90 degrees. For example, in an embodiment each area detector 225 is responsive to the processor 145, dependent upon the location of the source 210 and the support 280 along the translational degree of freedom, to revolve about a pivot 322, such that the area detector 225 is directed towards the source 210. An embodiment of the area detector 225 that has revolved about the pivot 322 to provide the incident angle f having the reduced deviation from 90 degrees is depicted in dashed lines. In another embodiment, the source 210 is responsive to the processor 145 to translate and thereby reduce the deviation of the incident angle from 90 degrees, as indicated by the source 210 depicted in dashed lines.

While embodiments have been described in which the area detector 225 revolves and the source 210 translates, it will be appreciated that the scope of the invention is not so limited, and that the invention will also apply to embodiments in which alternate means of orientating the area detector 225 relative to the source 210 to reduce a deviation of the incident angle from 90 degrees, such as revolving the support 280 to which the plurality of area detectors 225 are attached, as well as revolving the source 210, for example.

FIG. 10 depicts a plan view of the inspection system 100, with particular focus upon the area detector 225. A collimator 324 includes a plurality of collimator elements 325, and is disposed upon a front of the area detector 225, between the x-ray source 210 and inspected object and the scintillator 240. An example of an x-ray beam 330 illustrating scattering is depicted. It will be appreciated that the x-ray beam 330 is originally directed (as shown by the dashed line) to impinge on the scintillator 240 at location 335. However, as a result of scattering, the x-ray beam 330 is deflected such that it contacts and excites the scintillator 240 at location 340. In response to the x-ray 330 originally directed to location 335 exciting the scintillator 240 at location 340, the sensor 244 (and image pixel) corresponding to the location 340 detects photons that should have been detected by the sensor 244 corresponding to the location 335. This results in increased background in reconstruction of the image data set and alters the reconstructed image contrast and the capability of distinguishing the atomic number of the materials of interest.

Each collimator element 325 is made of a material to absorb or prevent transmission therethrough of an x-ray beam, such as the x-ray beam 330 that has been scattered, while allowing x-ray beams absent scattering (parallel to an orientation of the collimator elements 325) to arrive unimpeded at the scintillator 240. Collimators 324 are preferably made of high-density materials with high atomic number, such as lead, tungsten, tantalum, bismuth, and molybdenum, for example. Alternatively, collimators 324 are contemplated to be made from composite materials including high-density materials with high atomic number. Although collimators 324 are preferably made of high-density materials, it is contemplated that other materials may be suitable for use. Specifically, as depicted, the collimator element 345 attenuates the scattered x-ray beam 330, whereby either absorption in the collimator element 345 or redirection of the x-ray prevent it from exciting the scintillator 240 at location 340.

In an embodiment, an edge of one area radiation detector 225 adjacent to another radiation detector 225 defines a first direction (such as indicated by direction line 348). Radiation shielding 350 is disposed upon a portion of a front of each area detector 225 to shield processing electronics 355 that may be disposed at a periphery of the area detector 225 from at least one of direct and scattered radiation. The radiation shielding 350 is disposed outside the active area at edges 352 perpendicular to the direction line 348, and with substantial depth 353 perpendicular to the direction line 348.

In an embodiment a plate 354, made of a material such as metal for example, is placed in intimate contact with the scintillator 240 to reduce a size and weight of the collimator 324. A thickness of the plate 354 can vary in order to provide a desired reduction in the size and weight of the collimator 324. The plate 354 is contemplated to be of a thickness ranging from 0.25-mm to 2.5-mm thick and provides x-ray scatter reduction and/or electron intensification, while reducing the thickness and weight of the collimator. Non-limiting examples of materials from which the plate can be fabricated include lead, tungsten, tantalum, copper, bismuth, steel, and combinations thereof.

Referring now to FIG. 11, an end view of an embodiment of the LAXD 220 depicts a collimator 360 where the collimator elements 325, or septa are configured in two dimensions, which allow for a reduced height of collimator elements 325 for a given amount of scattering reduction. In another embodiment, the collimator elements 325 are disposed in one orientation.

Figure 13:
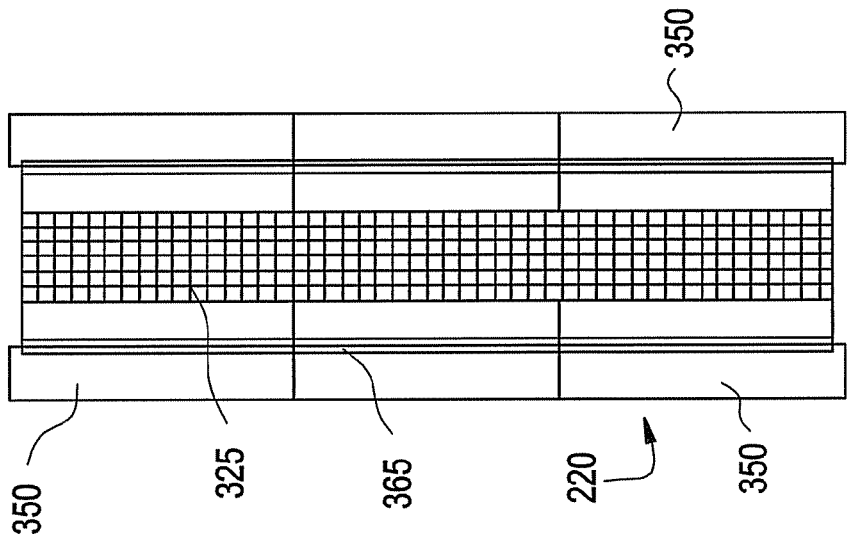
Figure 12:
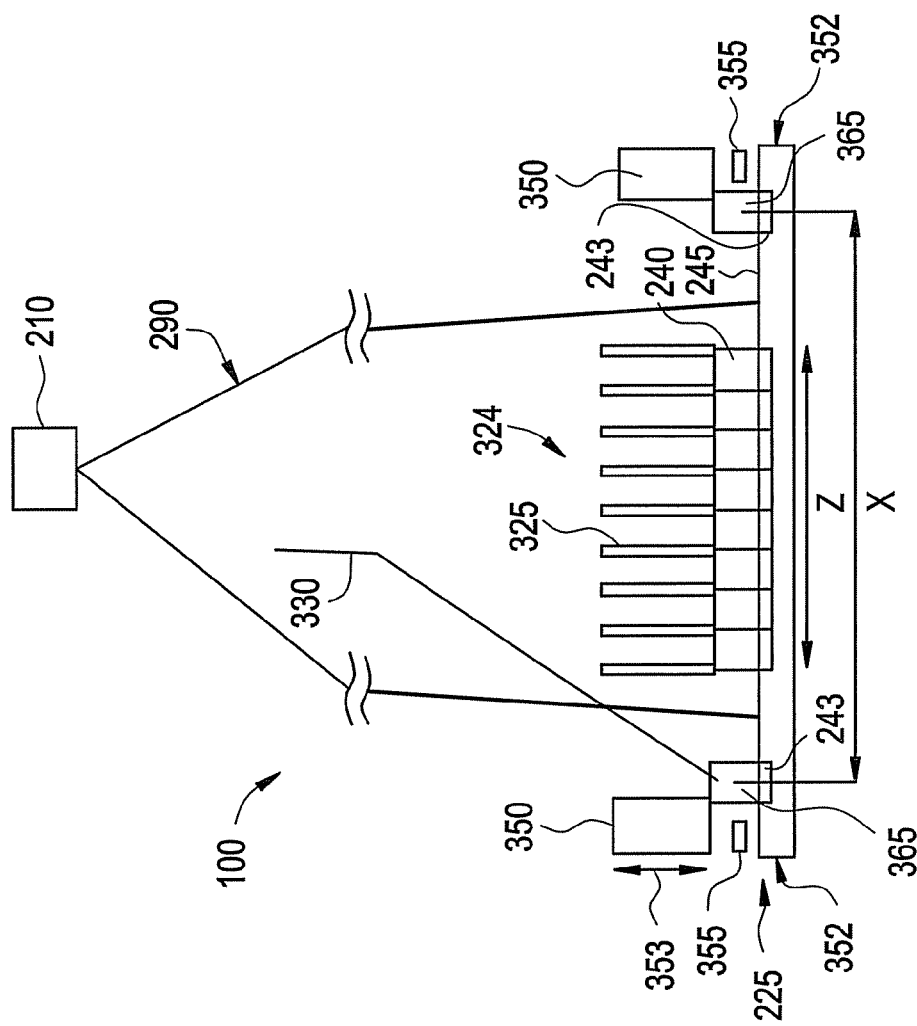

Referring now to FIG. 12 and FIG. 13, another embodiment of the system 100 and LAXD 220 are depicted. The scintillator 240 is disposed upon a portion (designated by dimension "Z" that is less than 100%) of the width of the area detector 225 of the LAXD 220. The x-ray source 210 is configured to project the plurality of x-ray beams 290 such that they are directed to the portion "Z" of the width of the area detector 225. Scatter scintillators 365 (also herein referred to as "scatter correction scintillators") are disposed upon the front of the area detector 225 at locations (designated by dimension "X") outside of the portion "Z" of the width of the area detector 225, such that they are on a portion of the area detector 225 not occupied by the collimator, and not excited by the plurality of x-ray beams 290 directed to the portion "Z". The scatter scintillators 365 are responsive to radiation from scattered x-ray beams, such as the scattered x-ray beam 330, for example. Sensors 243 disposed upon the substrate 245 proximate and corresponding to the location of the scatter scintillators 365 are responsive to photons emitted by the scatter scintillators 365 to generate electronic signals that are representative of an amount of scattered x-ray beams, such as the scattered x-ray beam 330, for example. The sensors 243 disposed corresponding to the location of the scatter scintillators 365 are in signal communication with the processor 145, and in response to the electronic signals representative of the amount of scattered x-ray beams, the processor 145 employs an image processing algorithm, such as a scatter correction algorithm, to reduce the effect of the scattered x-ray beams upon the reconstructed image data. The scatter correction algorithm reduces the effect of scattered x-rays and results in greater accuracy of the image data set by reducing the unwanted background. This allows extending the range of item thicknesses that the LAXD 220 can detect for the processor 145 to reconstruct into a single image, and an improvement of an accuracy of the determination of the presence or absence of the items of interest.

The intensity of the scattered x-rays in FIG. 12, is lower than that of the scattered beam shown in FIG. 10 due to the smaller portion "Z" of the width of the area detector 225. Additionally, use of the image-processing algorithm, reducing the effect of scattered x-ray beams upon the reconstructed image data set, allows reduction of a height of each of the plurality of collimator elements 325 to reject scattered radiation. One consideration in the choice of collimator geometry is the fact that the correction achieved by subtracting a scatter profile, while eliminating the bias or inaccuracy in mean pixel values, does not mitigate the statistical degradation due to the scattering contribution to the total signal.

In another embodiment, the scatter correction algorithm is used without the anti-scatter collimator 324. This is contemplated to reduce the system cost and complexity but would increase image noise due to the subtraction of a larger scattering signal.

In view of the foregoing, use of the LAXD 220, by nature of it's width, provides enhanced radiation data and statistical definition within the radiographic image data sets to meet challenging requirements for high-Z differentiation at high throughput. The enhanced statistical information facilitates an image signal processing method for improving a signal to noise ratio of images provided by the LAXD 220.

Figure 14:
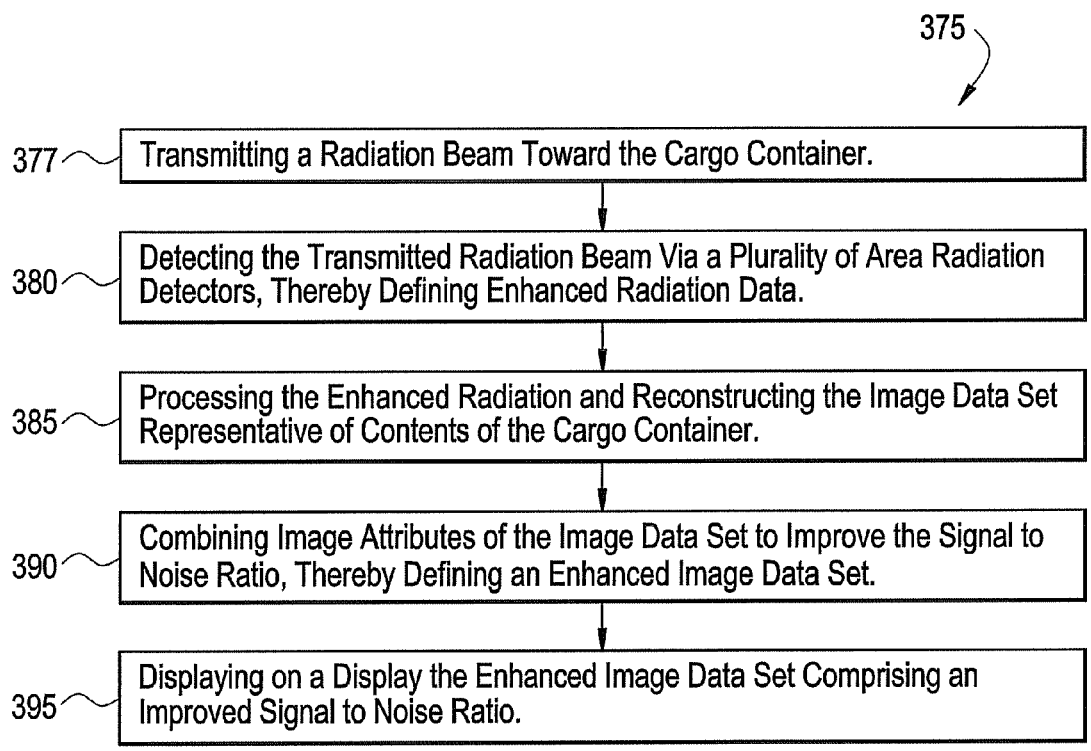
FIG. 14 depicts a flow chart of an embodiment of a method for improving the signal to noise ratio of images provided by the LAXD in accordance with an embodiment of the invention.

Referring now to FIG. 14, a flowchart 375 of process steps of the method for improving the signal to noise ratio of images of the image data set provided by the LAXD 220 is depicted. The method begins at Step 377 with transmitting a radiation beam from the x-ray source 210 toward the container 185. The method continues at Step 380 with detecting the transmitted radiation beam via the LAXD 220, having the plurality of area detectors 225, thereby defining the enhanced radiation data. The method continues at Step 385 with processing the enhanced radiation data and reconstructing the image data set including images representative of contents of the container 185. The method includes combining, at Step 390, image attributes, such as pixel intensity, intensity gradient, and other texture features for example to improve the signal to noise ratio, and thereby define an enhanced image data set. The method concludes with displaying, at Step 395, on the display 160 the enhanced image data set including images having the combined image attributes with the improved signal to noise ratio.

For example, the width of the LAXD 220 results in multiple images of almost a same area of the container 185 acquired at fast frame rates. An embodiment of the method for improving the signal to noise ratio of images provided by the LAXD 220 uses the shift and add image signal processing method. Processing the detected radiation to reconstruct the image data set at Step 385 includes developing the video stream at a defined input frame rate. The method further includes computing a translation of a geometric feature of an image of contents within the container 185 between adjacent frames of the video stream. For example, it will be appreciated that an input frame rate of 30 frames per second results in a frame period of 33.3 milliseconds (ms) per frame. Further, a motion of one of the container 185 or the x-ray source 210 and the LAXD 220 at a rate of 0.82 meters per second, represents a 0.027 meter (2.7 centimeter) displacement of the container 185 relative to the LAXD 220 in each adjacent frame and a corresponding translation of geometry within adjacent frames of the video stream. Therefore, use of a 20 centimeter wide LAXD 220 results in approximately 7 video frames of the image data set that each include at least some of the same geometric features (that translate from a leading edge of the LAXD 220 to a trailing edge of the LAXD 220) of items within the container 185. It will be appreciated that the foregoing is provided for purposes of illustration, as improvements in spatial resolution can be achieved by varying the rate of travel of the container 185 or the frame rate of the detector 220. For example, the detector frame rate may be adjusted to about 400 frames/sec offering a greater sampling of the object, but each with a lower total exposure time. In another embodiment, if motion is able to be halted, the averaging can be done by extending the exposure time of the detector 220, such as up to 30 seconds for example, and averaging subsequent frames once the exposure time limit is reached for that detector 220.

For shift and add processing, the combining at Step 390 includes using the computed geometry translation for accumulating a composite image from image attributes of the corresponding geometric features present within images of adjacent frames of the video stream. Image attributes (such as pixel intensity, intensity gradient, and other texture features, for example) corresponding to a particular image geometric feature from an initial frame are summed with image attributes corresponding to the same geometric feature from adjacent or subsequent (in time) frames. The shift can be calculated assuming a specific depth to reconstruct an image at that depth, or a range of depths to reconstruct images at these depths. For a single image, an embodiment includes reconstructing using a shift corresponding to the center of the cargo. The method further includes normalizing, such as averaging for example, the combined image attributes of the accumulated composite image for displaying, at Step 395 the enhanced image data set including normalized composite images. As described above, the normalized composite images have an improved signal to noise ratio as compared to any one of the individual images of the same geometry in multiple adjacent video frames.

Figure 17:
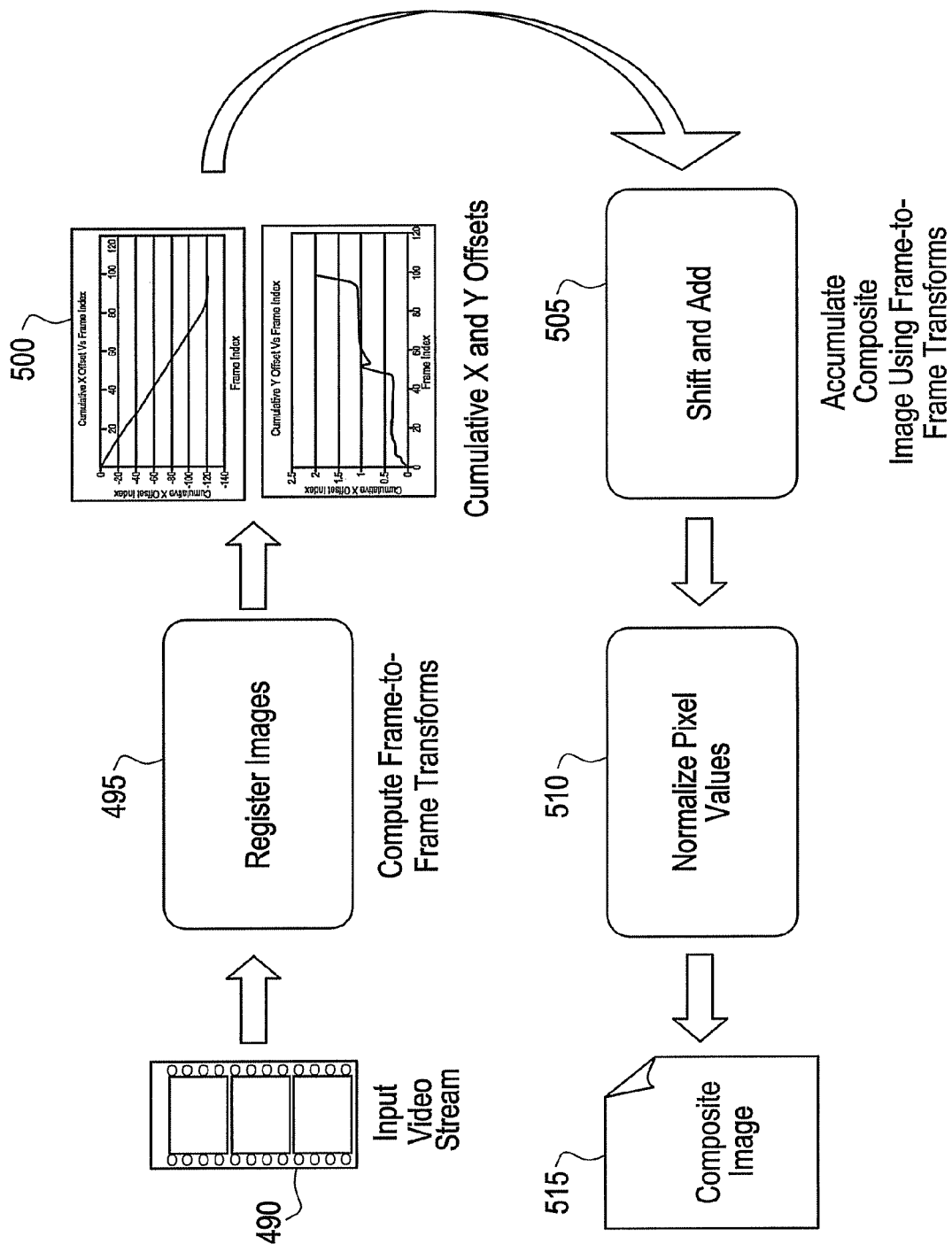
FIG. 17 depicts a block schematic diagram of a method for improving the signal to noise ratio of the image.

FIG. 17 depicts an exemplary embodiment of block schematic diagram of the shift and add signal processing method for improving the signal to noise ratio of the image and stitching together multiple views of an object to present a composite image to the operator. The incoming images, shown at block 490 are registered, at block 495 to one another to provide a mapping, shown in block 500 between a same point on a same object seen in multiple views. One can appreciate that this registration can be accomplished using hardware techniques or software algorithms, for example. After registration, improved SNR can be achieved by accumulating, shown in Block 505 the flux associated with each pixel and normalizing, shown in Block 510, by dividing by the total number of times each pixel was exposed to radiation. A composite image, shown in block 515 can then be formed by stitching together the frames acquired during the translation of the container 185 or the source 210 and detector 220.

In an embodiment using multiple energy inspection, the shift and add processing is performed separately for each energy, thereby providing enhanced detection of the atomic number of items of interest via the multi-energy imaging.

One of the disadvantages of using LDAs in conjunction with multiple energy inspection is that the volume of cargo inspected at the low energy is different from that inspected at the high energy, resulting in misregistration artifacts. The misregistration artifacts result from cargo movement and the fact that scanning the cargo at the multiple energies is not done simultaneously. In an embodiment, use of the LAXD 220 facilitates performing the shift and add processing in such a way that the volumes inspected by the low and high energy are virtually the same, thereby avoiding misregistration artifacts.

In an embodiment, the composite images provided by the shift and add temporal averaging are displayed on the display 160 to an operator of the system 100 as they become available. That is, (following the example provided above) a particular portion of geometry is displayed following collection and processing of all of the 7 frames of images in which the geometry is present, or subsequent to detection of the plurality of x-ray beams 290 through the particular portion of geometry by the trailing edge of the LAXD 220. In one embodiment, a "live", or real-time image of the container 185 is displayed on the display 160 immediately following reconstruction of the image data set (but prior to shift and add processing). It is contemplated that because such an image data set provides low statistic images and corresponds to a large amount of data that is difficult to analyze, it would be most useful during a debugging of the system 100.

As another example, the enhanced radiation data and statistical definition provided by the width of the LAXD 220 facilitates a spatial averaging, or combination of image elements known as a post image acquisition binning (also herein referred to as "binning") image signal processing method thereby improving the signal to noise ratio and contrast rendering of images within the image data set.

An embodiment of the method for improving the signal to noise ratio of images provided by the LAXD 220 uses the binning image signal processing method. In an embodiment of the binning image signal processing method, the combining at Step 390 includes combining together image attributes of more than one spatially adjacent pixels of an image into one larger, enhanced pixel. The combining of more than one pixel into the one enhanced pixel results in a contrast rendition, the intrinsic quantum x-ray statistics of which is improved by approximately the square root of the number of pixels binned, thereby providing improved contrast definition of the item of interest.

Use of binning provides multiple data streams for analysis and interpretation. For example, one data stream provides images having the native pixel resolution of the LAXD 220 to provide as much detail as possible for the detection of small features, such as wires, for example. Another data stream, created by the binning method, provides images that have reduced resolution but improved contrast. The binning method facilitates concurrent detection of low-opacity contraband threats and high-Z content in special nuclear materials (SNM) by combining spatially adjacent pixels within an image. This can be achieved in real-time, and both a binned image and a non-binned image can be provided for interpretation. For example, a native resolution data stream (with non-binned images) provides details for review of finer features, and the data stream including binned images improves contrast rendition of very dense cargo, such as an attempt to shield SNM, for example. In an embodiment, the binning method can be employed upon normalized composite images provided by the shift and add method.

Figure 15:
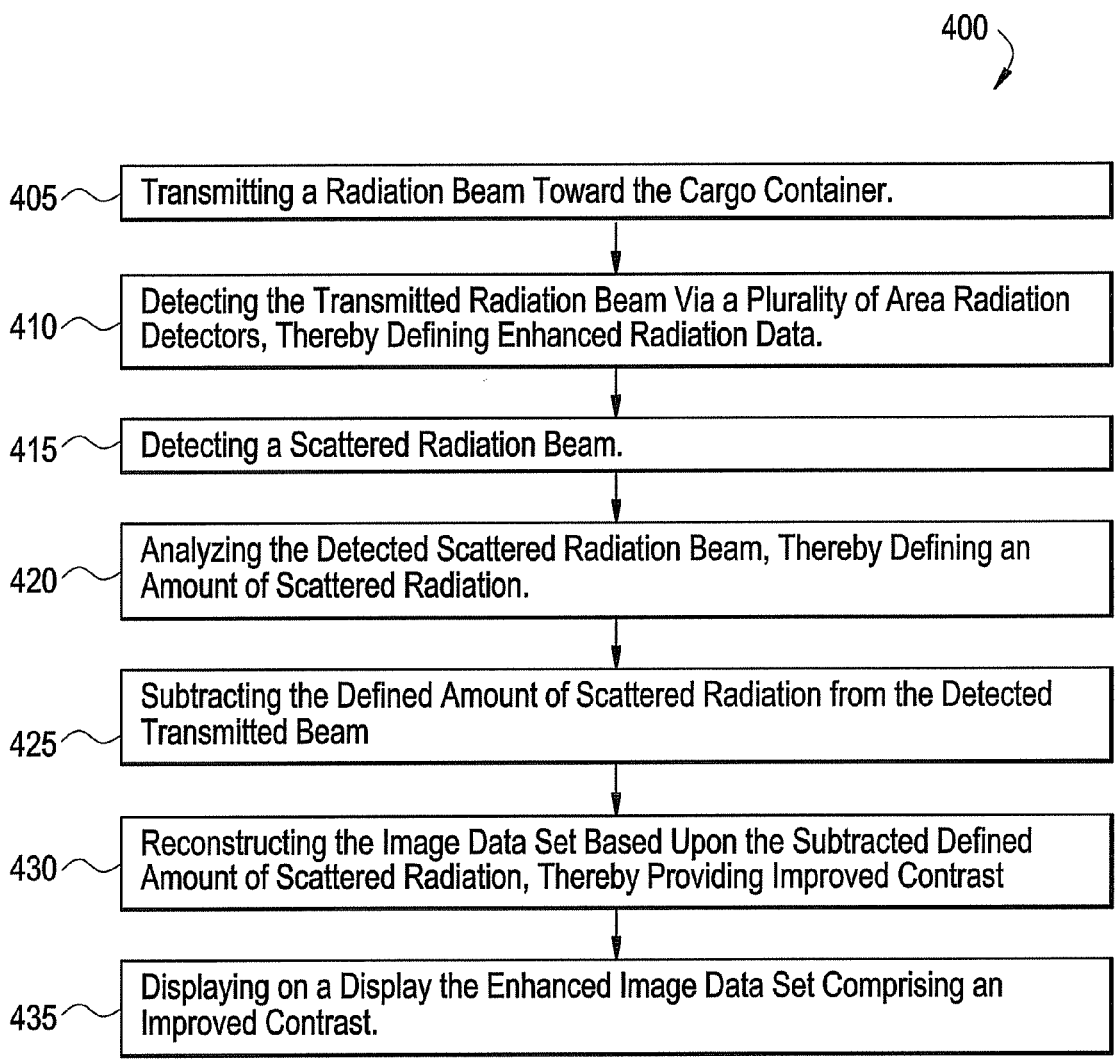
FIG. 15 depicts a flow chart of an embodiment of a method for improving the contrast of an image data set provided by the LAXD in accordance with an embodiment of the invention.

In view of the foregoing, use of the LAXD 220 also facilitates a method of improving contrast of the image data set of the container by reducing the effect of scattered radiation. Referring now to FIG. 15 in conjunction with FIG. 12, a flowchart 400 of process steps of the method for improving the contrast of the image data set is depicted.

The method begins at Step 405 by transmitting a radiation beam from the x-ray source 210 toward and through the cargo container 185. The method continues with detecting, at Step 410, the transmitted radiation beam via the LAXD 220, within the portion "Z" of the width of the area detector 225, thereby defining the enhanced radiation data. The method further includes detecting, at Step 415, the scattered radiation beam 330 via the scatter scintillator 365 and corresponding sensor 243 and analyzing, at Step 420 the scattered radiation beam 330 detected by the scatter scintillator 365, thereby defining an amount of scattered radiation via a scatter correction algorithm. An exemplary scatter correction algorithm is a signal decomposition algorithm based on the signal detected in the scatter scintillator 365 and experimentally calibrated parameters. The method proceeds with subtracting, at Step 425 the defined amount of scattered radiation from the detected primary radiation. The method includes reconstructing, at Step 430, by the processor 145, the image data set based upon the subtracted scattered radiation thereby providing improved contrast. The method concludes with displaying, at Step 435 on the display screen 160 the image data set comprising the improved contrast as a result of the scatter correction.

In an alternative embodiment, the scatter radiation is subtracted employing signal decomposition algorithms based on the signals detected in the primary detector, or portion "Z" of the width of the area detector 225, absent the scatter scintillators 365 and sensors 243. Such algorithms may be used with or without collimators 324.

Figure 16:
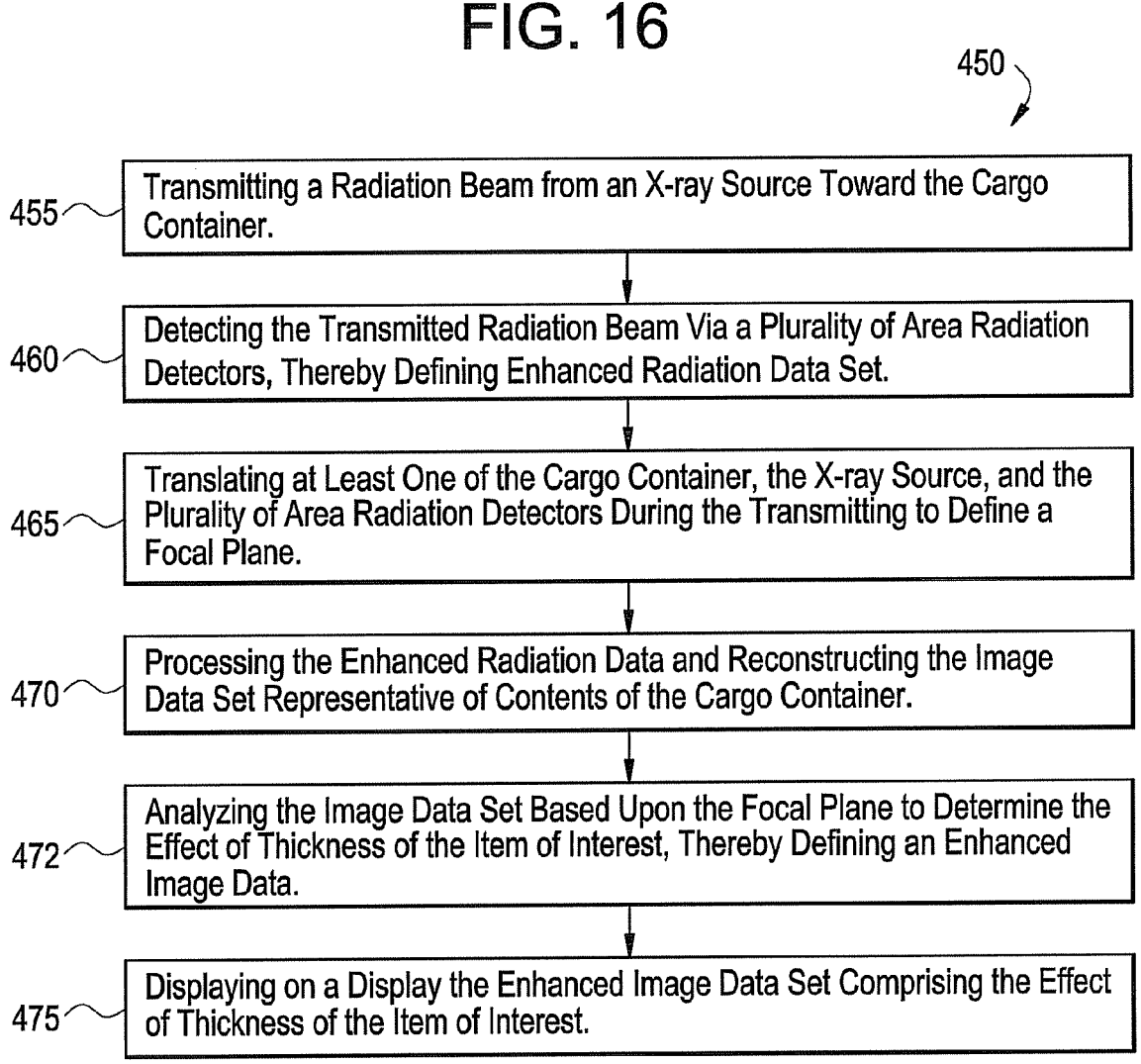
FIG. 16 depicts a flow chart of an embodiment of a method for determining an effect of thickness of an item of interest within the cargo container in accordance with an embodiment of the invention.

In view of the foregoing, use of the LAXD 220 facilitates another method, such as laminography or limited angle computed tomography for example, for determining the effect of thickness, distinguished from the effect of density, as related to the opacity of an image of the item of interest within the container 185. Referring now to FIG. 16, a flowchart 450 of process steps of the method for determining the effect of thickness of an item of interest within the container 185 is depicted.

The method begins by rotating the LAXD 220 to the horizontal position (best seen in FIG. 5) followed by with transmitting, at Step 455 a radiation beam from the x-ray source 210 toward and through the container 185. The method continues with detecting, at Step 460, the transmitted radiation beam via the LAXD 220, thereby defining enhanced radiation data for detecting the transmitted radiation. Translating, at step 465 at least one of the container 185, and the x-ray source 210 and the LA-XD 220 (together as one unit), relative to each other during the transmitting at Step 455 allows for collection of information at multiple angles that define a focal plane of the items of interest within the container 185. The method proceeds with processing, at Step 470 the enhanced radiation data and reconstructing the image data set representative of contents of the container 185 employing laminographic techniques. The method concludes with analyzing, at Step 472 the image data set based upon the focal plane to determine the effect of thickness of the item of interest, thereby defining the enhanced image data set, and displaying, at Step 475 upon the display 160 the enhanced image data set.

As described above, following identification by at least one of the processor 145 and the operator of the target portion of the container 185 deemed likely to include items of interest, a more thorough target inspection, including at least one of a finer rate of relative motion of the container 185 to the LAX-D 220, multiple angular views, laminography, limited angle computed tomography, and dual-energy discrimination can be employed to further define contents of the container located within the identified target portion of the container 185.

An embodiment of the invention may be embodied in the form of computer-implemented processes and apparatuses for practicing those processes. Embodiments of the present invention may also be embodied in the form of a computer program product having computer program code containing instructions embodied in tangible media, such as floppy diskettes, CD-ROMs, hard drives, USB (universal serial bus) drives, or any other computer readable storage medium, wherein, when the computer program code is loaded into and executed by a computer, the computer becomes an apparatus for practicing the invention. Embodiments of the invention also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to improve a signal to noise ratio of radiographic images of a cargo container as a result of use of the LAXD 220, thereby improving an accuracy of detection of items of interest within the cargo container.

As disclosed, some embodiments of the invention may include some of the following advantages: an ability to increase detection throughput of a cargo inspection system; an ability to provide enhanced signal statistics for subsequent processing; an ability to provide a detection area absent detection gaps; an ability to improve an image data set signal to noise ratio; and an ability to increase a detection accuracy of the inspection system while obtaining information on the atomic number of a item of interest, its thickness, and its location within the container.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed as new and desired to be protected by Letters Patent of the United States is:

1. A cargo container inspection radiation detector apparatus comprising:
   a frame;
   a support; and
   a plurality of area radiation detectors disposed upon the support arranged corresponding to a height of the cargo container, each area radiation detector comprising an active area defined by a matrix of pixels, wherein the support is pivotally attached to the frame and is capable of rotating to change an orientation of the plurality of area radiation detectors for performing at least one of limited angle computed tomography and laminography, wherein the change in orientation is in response to a signal indicative of a likelihood of an item of interest in the cargo container.

2. The apparatus of claim 1, wherein the matrix of pixels comprises at least 256 rows and 256 columns.

3. The apparatus of claim 1, wherein the active area of each area radiation detector defines a first plane, and
   the first plane of each area radiation detector is oriented perpendicular to an origin of radiation.

4. The apparatus of claim 1, wherein the active area of each area radiation detector defines a first plane, and the plurality of first planes of the plurality of area radiation detectors are parallel to each other.

5. The apparatus of claim 1, wherein a portion of one of the plurality of area radiation detectors is disposed in front of a portion of an active area of an adjacent one of the plurality of area radiation detectors, thereby creating an overlap and reducing a gap between an active area of the one area radiation detector and the active area of the adjacent area radiation detector.

6. The apparatus of claim 5, wherein the active area of the one area radiation detector is adjacent to the active area of the adjacent area radiation detector, thereby resulting in a continuous combined active area.

7. The apparatus of claim 1, wherein each of the plurality of area radiation detectors is a flat panel radiation detector.

8. The apparatus of claim 7, wherein each flat panel radiation detector comprises a scintillator.

9. The apparatus of claim 8, wherein the scintillator comprises at least one of a needle based CsI:T1, polycrystalline CsI:T1, single crystal pixelized CsI:T1, single crystal pixelized CdWO4, fiber optic faceplates of luminescent glass, Gadolinium oxysulfide (GOS) screens or combinations thereof.

10. The apparatus of claim 7, comprising a collimator disposed upon a front of each flat panel radiation detector.

11. The apparatus of claim 10, wherein the collimator is disposed upon a front of a portion of each flat panel radiation detector, the portion of each flat panel radiation detector receiving the respective collimator being less than 100% of the respective flat panel detector area.

12. The apparatus of claim 11, wherein the collimator is a two-dimensional collimator.

13. The apparatus of claim 10, comprising a plate disposed between the collimator and the front of each flat panel radiation detector.

14. The apparatus of claim 13, wherein the plate comprises at least one of lead, tungsten, tantalum, copper, bismuth, steel, or combinations thereof.

15. The apparatus of claim 7, wherein at least one flat panel radiation detector of the plurality of flat panel radiation detectors comprises at least one scatter correction scintillator disposed upon a front of the at least one flat panel radiation detector on a portion of the flat panel radiation detector.

16. The apparatus of claim 1, wherein the support has a translational degree of freedom for positioning the plurality of area radiation detectors at a location of interest.

17. The apparatus of claim 16, wherein the orientation is a first orientation and the plurality of area radiation detectors are pivotally attached to the support and are capable of revolving to change a second orientation of the plurality of area radiation detectors to maintain orientation toward a focal point.

18. The apparatus of claim 1, wherein:
   an edge of one of the plurality of area radiation detectors adjacent to another of the plurality of area radiation detectors defines a first direction;
   the apparatus further comprises radiation shielding disposed upon a portion of a front of each of the plurality of area radiation detectors; and
   the radiation shielding is disposed outside the respective active area of each of the plurality of area radiation detectors at an edge perpendicular to the first direction and with substantial depth perpendicular to the first direction to shield electronics of area radiation detector.

19. The apparatus of claim 1, wherein the matrix of pixels comprises at least 1024 rows and 1024 columns.

20. The apparatus of claim 1, wherein a height and a width of the active area of each of the plurality of area radiation detectors are each at least approximately 20 centimeters.

21. The apparatus of claim 20, wherein the height and the width of the active area of each of the plurality of area radiation detectors are each at least approximately 40 centimeters.

22. The apparatus of claim 1, wherein a width of each of the plurality of detectors is at least approximately 20 centimeters.

23. A cargo container inspection system, comprising:
a processor;
a support comprising an inspection cavity dimensioned so as to surround the cargo container, the support in signal communication with the processor;
a radiation source in signal communication with and responsive to the processor to transmit a radiation beam directed toward the cargo container; and
a plurality of area radiation detectors disposed opposite the radiation source, the plurality of area radiation detectors disposed upon the support arranged corresponding to a height of the cargo container and in signal communication with the processor to detect an attenuated radiation beam in response to the transmitted radiation beam passing though the cargo container, each area radiation detector comprising an active area defined by a matrix of pixels;
wherein the processor analyzes the attenuated radiation beam detected in response to the transmission of the radiation beam directed toward the cargo container to determine a presence or absence of items of interest within the cargo container and generates one of a first signal indicative of the presence of the items of interest, or a second signal indicative of an absence of the items of interest;
wherein a portion of one of the plurality of area radiation detectors is disposed in front of a portion of an active area of an adjacent one of the plurality of area radiation detectors, thereby creating an overlap and reducing a gap between an active area of the one area radiation detector and the active area of the adjacent area radiation detector.

24. The system of claim 23, wherein the matrix of pixels has at least 256 rows and 256 columns.

25. The system of claim 23, wherein the transmitted radiation beam is a multiple-energy radiation beam, and the radiation source is an interlaced radiation source.

26. The system of claim 23, wherein the radiation source is a first radiation source, the system further comprising:
a second radiation source;
wherein the transmitted radiation beam is a multiple-energy radiation beam; and
wherein the first radiation source generates one energy distribution of the multiple-energy x-ray beam and the second radiation source generates another energy distribution of the multiple-energy x-ray beam.

27. The system of claim 23, wherein:
the active area of each area radiation detector defines a first plane; and
the first plane of each area radiation detector is oriented perpendicular to the radiation source.

28. The system of claim 23, wherein:
the active area of each area radiation detector defines a first plane; and
the plurality of first planes of the plurality of area radiation detectors are parallel to each other.

29. The system of claim 23, wherein the active area of the one area radiation detector is adjacent to the active area of the adjacent area radiation detector, thereby resulting in a continuous combined active area.

30. The system of claim 23, wherein each of the plurality of area radiation detectors is a flat panel radiation detector.

31. The system of claim 30, comprising a collimator disposed upon a front of each flat panel radiation detector.

32. The system of claim 31, wherein:
the collimator is disposed upon a front of a portion of each flat panel radiation detector, the portion of each flat panel radiation detector receiving the respective collimator being less than 100% of the respective flat panel detector area.

33. The system of claim 30, wherein at least one flat panel radiation detector of the plurality of flat panel radiation detectors comprises:
at least one scatter correction scintillator disposed upon a front of the at least one flat panel radiation detector on a portion of the flat panel radiation detector, the at least one scatter correction scintillator responsive to a scattered x-ray beam to emit photons; and
at least one sensor disposed proximate the scatter correction scintillator and in signal communication with the processor, the at least one sensor responsive to the emitted photons to generate a scatter signal;
wherein the processor analyzes the scatter signal to improve an accuracy of the determination of the presence or absence of the items of interest.

34. The system of claim 23, comprising:
a frame;
wherein the support is pivotally attached to the frame and is capable of rotating;
means for rotating the support relative to the frame, the means responsive to the processor to change an orientation of the plurality of area radiation detectors;
means for translating at least one of the cargo container, the radiation source, and the support, the means for translating responsive to the processor;
wherein subsequent to rotation of the support relative to the frame, the radiation source is responsive to the processor to transmit the radiation beam while the means for translating translates one of the radiation source, the cargo container, and the support relative to each other.

35. The system of claim 34, wherein the radiation source is a first radiation source disposed so as to provide a first angle from the first radiation source relative to the plurality of area radiation detectors, the system further comprising a second radiation source disposed so as to provide a second angle from the second radiation source relative to the plurality of area radiation detectors.

36. The system of claim 23, wherein the matrix of pixels comprises at least 1024 rows and 1024 columns.

37. The system of claim 20, wherein the radiation source is a non-interlaced radiation source.

38. The system of claim 20, wherein the radiation source comprises a plurality of non-interlaced radiation sources.

39. A cargo container inspection radiation detector apparatus comprising:
a support; and
a large area X-ray detector comprising:
a plurality of area radiation detectors disposed upon the support arranged corresponding to a height of the cargo container, wherein each of the plurality of area radiation detectors comprise an active area defined by a matrix of pixels, further wherein a portion of one of the plurality of area radiation detectors is disposed in front of a portion of an active area of an adjacent one of the plurality of area radiation detectors, thereby creating an overlap.

* * * * *